(12) United States Patent
Kakuho et al.

(10) Patent No.: US 6,718,957 B2
(45) Date of Patent: Apr. 13, 2004

(54) INTELLIGENT CONTROL TO STABILIZE AUTO-IGNITION COMBUSTION WITHOUT RAPID PRESSURE INCREASE

(75) Inventors: Akihiko Kakuho, Kanagawa (JP); Hiroshi Miyakubo, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 257 days.

(21) Appl. No.: 09/970,853

(22) Filed: Oct. 5, 2001

(65) Prior Publication Data

US 2002/0046741 A1 Apr. 25, 2002

(30) Foreign Application Priority Data

Oct. 19, 2000 (JP) .......................... 2000-319361

(51) Int. Cl.$^7$ .............................................. F02M 25/07
(52) U.S. Cl. .................. 123/568.14; 123/90.15
(58) Field of Search .................. 123/568.14, 568.22, 123/90.15, 90.11

(56) References Cited

U.S. PATENT DOCUMENTS

| | | | |
|---|---|---|---|
| 5,669,343 A | 9/1997 | Adachi | 123/90.17 |
| 5,785,016 A | 7/1998 | Enderle et al. | 123/90.11 |
| 5,836,276 A | 11/1998 | Iwasaki et al. | 123/90.17 |
| 6,082,342 A | * 7/2000 | Duret et al. | 123/568.14 |
| 6,305,364 B1 | * 10/2001 | Ma | 123/568.14 |
| 6,536,407 B1 | * 3/2003 | Denbratt | 123/311 |

FOREIGN PATENT DOCUMENTS

| | | | |
|---|---|---|---|
| JP | 10-266878 | | 10/1998 |
| SE | WO0028197 | * | 5/2000 |

OTHER PUBLICATIONS

U.S. patent application Ser. No. 09/934,588, Tsuneyasu Nohara et al., filed Aug. 23, 2001.
U.S. patent application Ser. No. 09/767,025, Tomonori Urushihara et al., filed Jan. 23, 2001.
U.S. patent application Ser. No. 09/813,892, Koji Hiraya et al., filed Mar. 22, 2001.

* cited by examiner

Primary Examiner—Mahmoud Gimie
(74) Attorney, Agent, or Firm—Foley & Lardner

(57) ABSTRACT

The present invention concerns a method and a system for operating an internal combustion engine capable of performing auto-ignition combustion as well as spark-ignition combustion. In auto-ignition combustion mode, inlet and outlet control devices are adjusted to retain a portion of exhaust gas for subjecting the retained exhaust gas to compression. In one preferred embodiment, a parameter indicative of engine-surrounding environment is monitored. Closing timing of the outlet control device is adjusted in response to the monitored parameter, thereby to vary an exhaust gas retaining duration when there is a change in the monitored parameter.

46 Claims, 14 Drawing Sheets

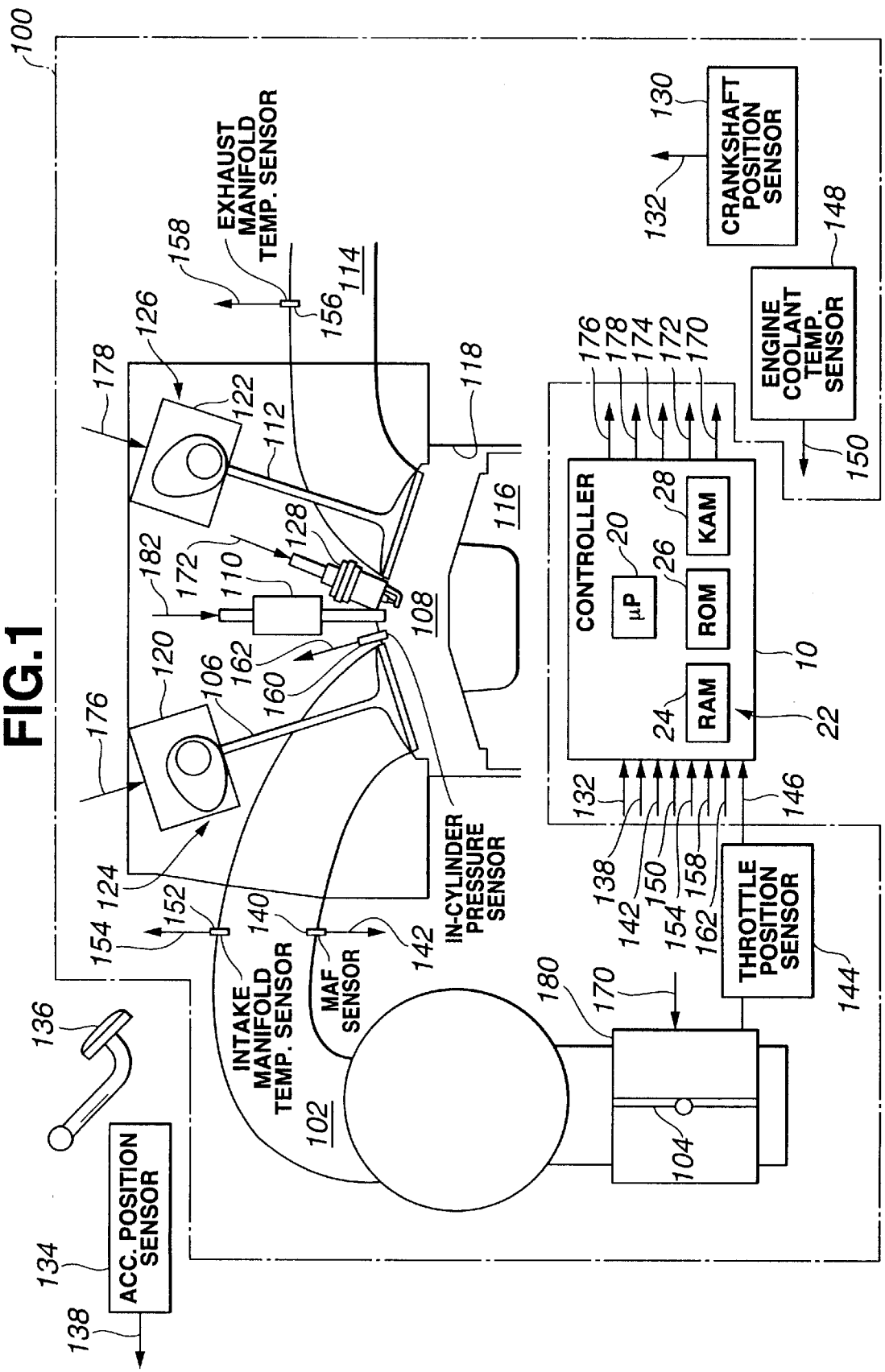

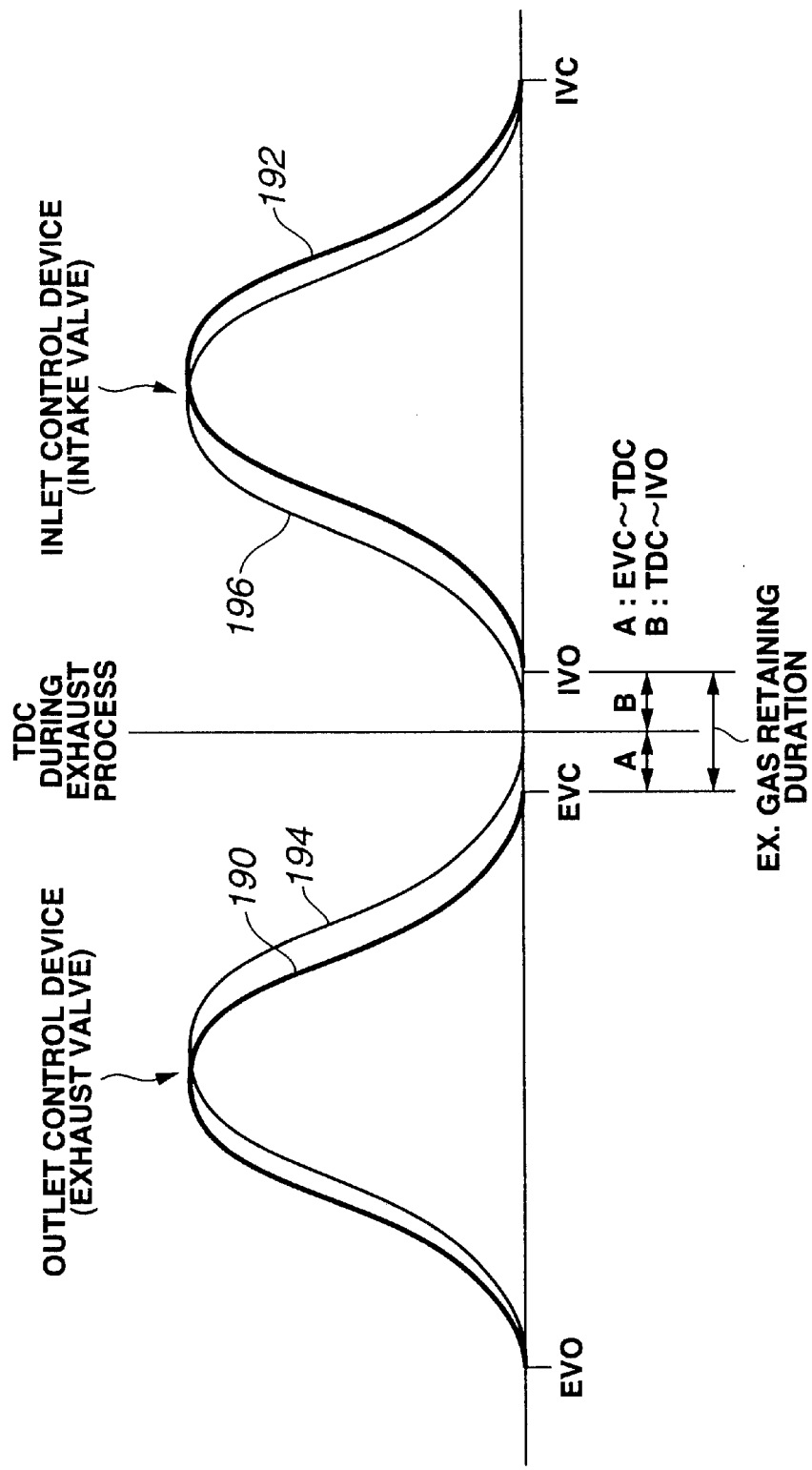

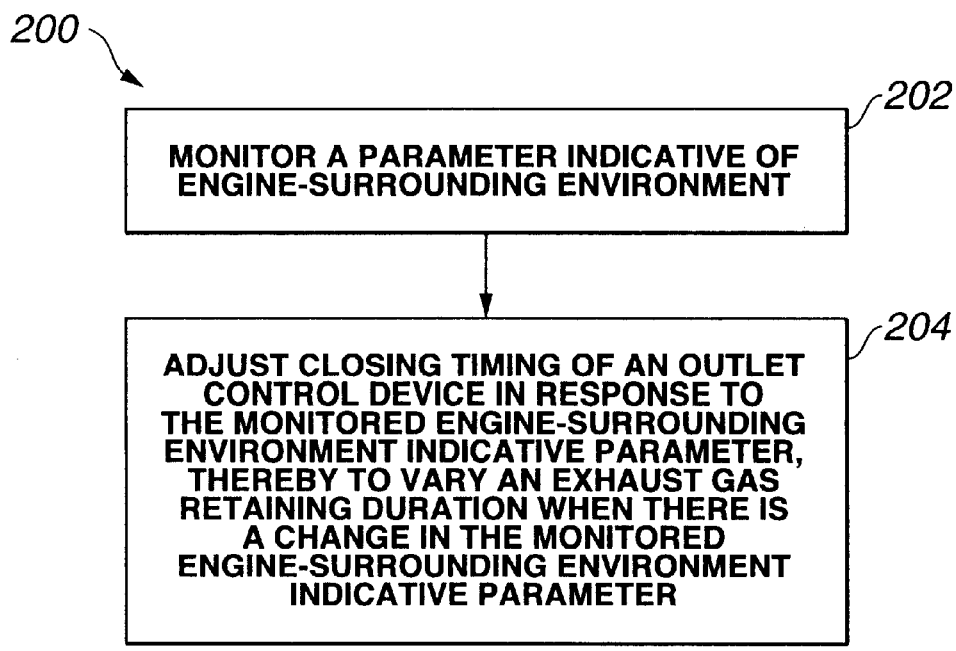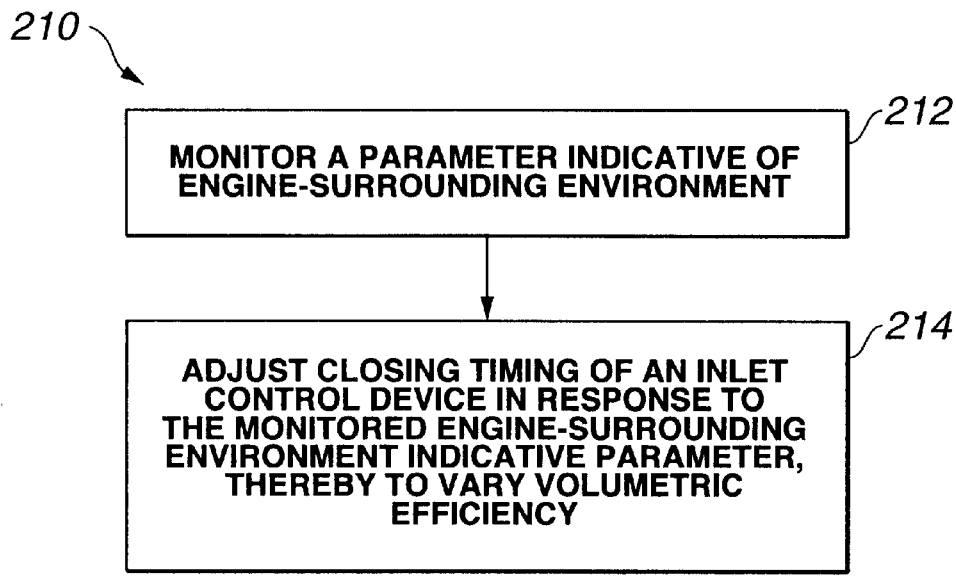

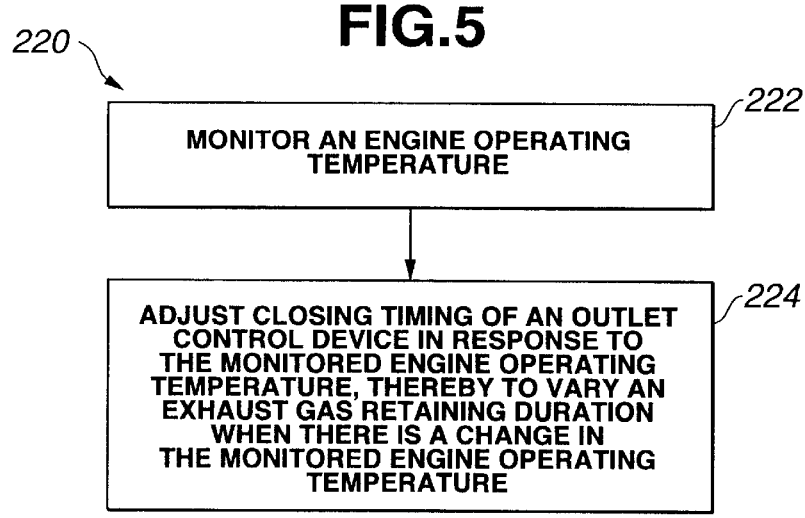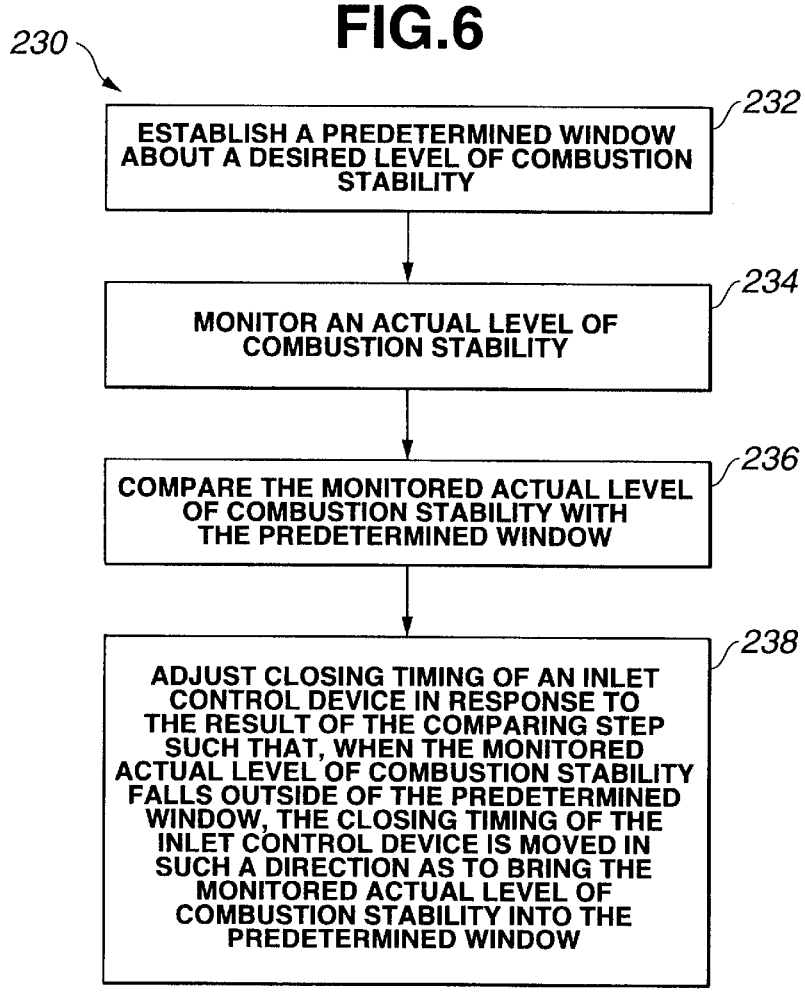

INTELLIGENT CONTROL TO STABILIZE AUTO-IGNITION COMBUSTION WITHOUT RAPID PRESSURE INCREASE

BACKGROUND OF THE INVENTION

1. Field of the Invention

The present invention relates to the field of engine control to induce auto-ignition combustion of fuel including gasoline, and more particularly to the field of stabilizing auto-ignition combustion without rapid increase of in-cylinder pressure.

2. Description of Related Art

According to JP-A 10-266878, it is known to vary an exhaust gas retaining duration to accomplish auto-ignition combustion of gasoline fuel over varying load request from low to middle level. Exhaust gas retaining duration extends from closure (or closing timing) of exhaust valve to opening (or opening timing) of intake valve. To meet decreasing load request, closure of exhaust valve is moved to increase the amount of advance from top dead center during exhaust or induction process, thereby to increase remaining exhaust gas content to decrease in quantity fresh intake air. Besides, opening of intake valve is moved to increase the amount of delay from top dead center during exhaust or induction process in cooperation with the movement of closure of exhaust valve to meet decreasing load request. In brevity, exhaust gas retaining duration is varied to meet varying load request. With regard to closure of intake valve, the closure is after bottom dead center during induction process. Closure of intake valve is moved to decrease the amount of delay from bottom dead center during induction process, thereby to increase compression ratio to raise in-cylinder temperature during operation with load where auto-ignition is difficult to accomplish. JP-A 10-266878 appears to contemplate an engine, which has achieved auto-ignition combustion to meet varying load request from low to middle level. However, JP-A 10-266878 does not contemplate a solution to stabilizing auto-ignition combustion without rapid increase of in-cylinder pressure against a change other than a change in load request.

SUMMARY OF THE INVENTION

It is one object of the present invention to stabilize auto-ignition combustion against a change other than a change in load request.

In accordance with the object of the present invention, in a preferred embodiment, auto-ignition combustion is stabilized against a change other than a change in load request by carrying out a method of operating an internal combustion engine having an inlet control device for controlling flow of intake air into at least one cylinder, a fuel injection device for supplying fuel into the cylinder and an outlet control device for controlling flow of exhaust gas resulting from combustion within the cylinder, which inlet and outlet control devices are adjusted to retain a portion of the exhaust gas for subjecting the retained exhaust gas to compression, the method comprising:

monitoring a parameter indicative of engine-surrounding environment; and adjusting closing timing of the outlet control device in response to the monitored engine-surrounding environment indicative parameter, thereby to vary an exhaust gas retaining duration from the closing timing event of the outlet control device to opening timing event of the inlet control device when there is a change in the monitored engine-surrounding environment indicative parameter.

The inventors here have recognized that a change in engine-surrounding environment may cause a variation in pressure, temperature, and excess air ratio around top dead center during compression process, all of which, in turn, cause variation in ignition timing and combustion duration of auto-ignition combustion. An advantage of the above-mentioned preferred embodiment is that variation in ignition timing and combustion duration of auto-ignition combustion is prevented or at least suppressed to hold appropriate ignition timing and combustion duration against a change in engine-surrounding environment.

In another or second preferred embodiment of the present invention, auto-ignition combustion is stabilized against a change other than a change in load request by carrying out a method of operating an internal combustion engine having an inlet control device for controlling flow of intake air into at least one cylinder, a fuel injection device for supplying fuel into the cylinder and an outlet control device for controlling flow of exhaust gas resulting from combustion within the cylinder, which inlet and outlet control devices are adjusted to retain a portion of the exhaust gas for subjecting the retained exhaust gas to compression, the method comprising:

monitoring a parameter indicative of engine-surrounding environment; and adjusting closing timing of the inlet control device in response to the monitored engine-surrounding environment indicative parameter.

A change in engine-surrounding environment may cause a drop in pressure around top dead center during compression process. Such a drop in pressure causes auto-ignition at a delayed timing, resulting in prolonged combustion duration because of descending movement of a piston during the final stage of combustion. Such combustion is low in thermal efficiency and may induce misfire event. A change in engine-surrounding environment may cause a reduction of excess air around top dead center during compression process. With the same volumetric efficiency, a drop in density of air causes a reduction of excess air ratio around top dead center during compression process. Reduction in excess air ratio may cause rapid burning during combustion after auto-ignition or may cause auto-ignition at an early time prior to appropriate timing. Rapid burning and/or early ignition may cause knock event to occur, increasing, in level, combustion noise. Reduction in excess air ratio may cause an increase in amount of NOx emission. The second preferred embodiment contemplates adjusting closing timing of the inlet control device so as to vary the volumetric efficiency. An advantage of the second preferred embodiment is that variation in ignition timing and combustion duration of auto-ignition combustion is prevented or at least suppressed to hold appropriate ignition timing and combustion duration against a change in engine-surrounding environment by varying the volumetric efficiency.

In a third preferred embodiment of the present invention, auto-ignition combustion is stabilized against a change other than a change in load request by carrying out a method of operating an internal combustion engine having an inlet control device for controlling flow of intake air into at least one cylinder, a fuel injection device for supplying fuel into the cylinder and an outlet control device for controlling flow of exhaust gas from the cylinder, which inlet and outlet control devices are adjusted to retain a portion of the exhaust gas for subjecting the retained exhaust gas to compression, the method comprising:

monitoring an engine operating temperature; and adjusting closing timing of the outlet control device in response to the monitored engine operating temperature, thereby to vary an exhaust gas retaining duration from the closing timing event of the outlet control device to opening timing event of the inlet control device when there is a change in the monitored engine operating temperature.

A change in engine operating temperature as represented by an engine oil temperature or an engine coolant temperature may cause a variation in temperature, and excess air ratio around top dead center during compression process, all of which, in turn, cause variation in ignition timing and combustion duration of auto-ignition combustion. A variation of in-cylinder temperature may cause a variation in mass of intake air inhaled per one cycle with the volumetric efficiency held the same. An advantage of the third preferred embodiment is that variation in ignition timing and combustion duration of auto-ignition combustion is prevented or at least suppressed to hold appropriate ignition timing and combustion duration by varying an exhaust gas retaining duration to vary in-cylinder temperature during the next cycle when there is a change in engine operating temperature. During the early stages of a cold start of an engine, the engine operating temperature inhibits build-up of appropriate temperature and excess air ratio around top dead center during compression process, making it difficult to achieve stable auto-ignition combustion. The third preferred embodiment of the present invention contemplates varying exhaust gas retaining duration to retain appropriate amount of exhaust gas needed to raise in-cylinder temperature for proper combustion in the next engine cycle.

In a fourth preferred embodiment of the present invention, auto-ignition combustion is stabilized against a change other than a change in load request by carrying out a method of operating an internal combustion engine having an inlet control device for controlling flow of intake air into at least one cylinder, a fuel injection device for supplying fuel into the cylinder, and an outlet control device for controlling flow of exhaust gas resulting from combustion within the cylinder, which inlet and outlet control devices are adjusted to retain a portion of the exhaust gas for subjecting the retained exhaust gas to compression, the method comprising:

establishing a predetermined window about a desired level of combustion stability within the engine;

monitoring an actual level of combustion stability within the engine;

comparing the monitored actual level of combustion stability with the predetermined window; and adjusting closing timing of the inlet control device in response to the result of the comparing step such that, when the monitored actual level of combustion stability falls outside of the predetermined window, the closing timing of the inlet control device is moved in such a direction as to bring the monitored actual level of combustion stability into the predetermined window.

During operation of an engine over the number of engine cycles with bad combustion stability, the cycle-by-cycle variation in combustion termination is considerably great, so the cycle-by-cycle variation in temperature of the retained exhaust gas during exhaust gas retaining duration is inevitably great. As a result, the quantity of intake air inhaled and in-cylinder temperature around top dead center during compression process vary from one to another of the engine cycles. Further, the density of unburnt fuel within the retained exhaust gas per one cycle may differ considerably from that per one of the subsequent cycles during engine operation with bad combustion stability. The density of unburnt fuel within the retained exhaust gas determines the quantity of radicals created. An advantage of the fourth preferred embodiment of the present invention is that combustion stability is monitored and closing timing of inlet control device is moved in such a direction as to bring the monitored actual level of combustion stability into a predetermined window about a desired level of combustion stability. Rather than factors deemed to induce combustion instability in combination or independently, the actual level of combustion stability is monitored according to the fourth embodiment of the present invention.

BRIEF DESCRIPTION OF THE DRAWINGS

The present invention will be more fully appreciated as the same becomes better understood from the following detailed description when considered in connection with the accompanying drawings, in which like reference numerals and characters designate like or corresponding parts through the several views.

FIG. 1 is a block diagram of a preferred embodiment.

FIG. 2 is a valve lift diagram illustrating an exhaust gas retaining duration from exhaust valve closure (EVC) of an outlet control device to intake valve opening (IVO) of an inlet control device.

FIG. 3 is a block diagram illustrating a method of the present invention for stabilizing auto-ignition combustion in an internal combustion engine.

FIG. 4 is a block diagram illustrating a method of the present invention for stabilizing auto-ignition combustion in an internal combustion engine.

FIG. 5 is a block diagram illustrating a method of the present invention for stabilizing auto-ignition combustion in an internal combustion engine.

FIG. 6 is a block diagram illustrating a method of the present invention for stabilizing auto-ignition combustion in an internal combustion engine.

FIG. 10(A2) illustrates a characteristic line of exhaust gas retaining duration versus correction coefficient m1, which is given by multiplying the factors m1' and m1 ".

FIG. 10(B1) is a map with lines, each drawn through all points of equal value of a correction coefficient m2, illustrating the variation of m2 against varying values of engine operating temperature (or temperature of intake air) and pressure of intake air (or mass flow rate of intake air).

FIG. 10(B2) illustrates a characteristic of IVC delay from BDC during induction process versus correction coefficient B2.

FIG. 10(C1) is a map with lines, each drawn through all points of equal value of a correction coefficient factor m3", illustrating the variation of m3" against varying values of engine operating temperature (or temperature of intake air) and pressure of intake air (or mass flow rate of intake air).

FIG. 10(C2) illustrates a characteristic of fuel quantity for first injection versus correction coefficient m3, which is given by multiplying the factors m3' and m3".

BEST MODES FOR CARRYING OUT THE INVENTION

Figure 7:
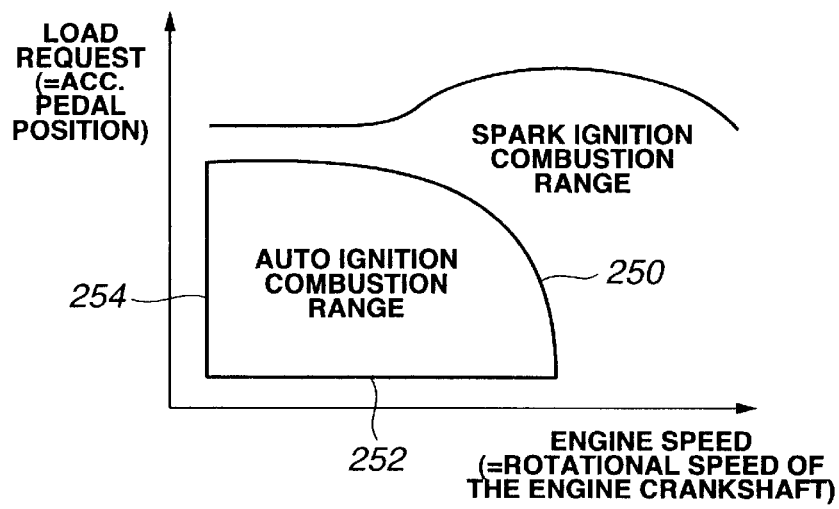
FIG. 7 is a view of so-called "combustion mode selection map" illustrating an auto-ignition combustion range separated from a spark-ignition combustion range.

FIG. 1 shows an electronic engine controller (ECC) 10 and an internal combustion engine 100, which comprises a plurality of cylinders, one of which is shown in FIG. 1. Engine 100 draws an intake air charge through intake manifold 102 past a throttle plate 104, and intake valve 106 and into combustion chamber 108. An air/fuel mixture, which consists of the air charge and fuel injected by fuel injector 110 of a fuel injection device, is ignited in combustion chamber 108, and exhaust gas resulting from combustion of the air/fuel mixture is transported past exhaust valve 112 through exhaust manifold 114. A piston 116 is coupled to a crankshaft, not shown, and moves in a linear fashion within a cylinder defined by cylinder walls 118.

Valve controllers 120 and 122 are provided to actuate intake and exhaust valves 106 and 112. In a preferred embodiment, intake valve 106 and valve controller 120 constitute an inlet control device 124 for controlling flow of intake air into combustion chamber 108 within cylinder defined by cylinder walls 118. Exhaust valve 112 and valve controller 122 constitute an outlet control device 126 for controlling flow of exhaust gas resulting from combustion within cylinder defined by cylinder walls 118. Fuel injector 110 is positioned to inject gasoline fuel directly into combustion chamber 108. A spark plug 128 operates in a conventional manner in spark ignition combustion mode to ignite air/fuel mixture in combustion chamber 108.

A crankshaft position sensor 130 detects the rotation of the crankshaft and transmits a crankshaft position signal 132 to controller 10. Crankshaft position signal 132 preferably takes the form of a series of pulses, each pulse being caused by the rotation of a predetermined point on the crankshaft past sensor 130. The frequency of pulses on the crankshaft position signal 132 is thus indicative of the rotational speed of the engine crankshaft. An accelerator position sensor 134 detects the angular position of an accelerator pedal 136 and transmits an accelerator position signal 138 to controller 10. Accelerator position sensor 134 preferably takes the form of potentiometer. A Mass AirFlow (MAF) sensor 140 detects the mass flow rate of intake air through intake manifold 102 and transmits a flow rate signal 142 to controller 10. MAF sensor 140 preferably takes the form of a hot wire anemometer. A throttle position sensor 144 detects the angular position of throttle plate 104 and transmits a throttle position signal 146 to controller 10. Throttle position sensor 144 preferably takes the form of potentiometer. An engine coolant temperature sensor 148 detects the temperature of engine coolant circulating within the engine and transmits a coolant temperature signal 150 to controller 10. Engine coolant temperature sensor 148 preferably takes the form of thermistor. An intake manifold temperature sensor 152 detects the temperature of intake air within intake manifold 102 and transmits an intake air temperature signal 154 to controller 10. Intake manifold temperature sensor 152 preferably takes the form of thermistor. An exhaust manifold temperature sensor 156 detects the temperature of exhaust gas within exhaust manifold 114 and transmits an exhaust gas temperature signal 158 to controller 10. Exhaust manifold temperature sensor 156 preferably takes the form of thermistor. An in-cylinder pressure sensor 160 detects in-cylinder pressure within the cylinder and transmits an in-cylinder pressure signal 162 to controller 10. In-cylinder pressure sensor 160 preferably takes the form piezoelectric sensor placed in or near spark plug 128 and piezoelectric washer under the spark plug 128.

In one preferred embodiment of the present invention, controller 10 comprises a microprocessor-based controller with associated microprocessor, represented by a reference numeral 20. Microprocessor 20 communicates with associated computer-readable storage media 22. As will be appreciable by one of ordinary skill in the art, computer-readable storage media 22 may include various devices for storing data representing instructions executable by the microprocessor to control the engine. For example, computer-readable storage media 22 may include a random access memory (RAM) 24, a read-only memory (ROM) 26, and/or a keep-alive memory (KAM) 28. These functions may be performed through any one of a number of known physical devices including EPROM, EEPROM, flash memory, and the like. The present invention is not limited to a particular type of computer-readable storage medium, examples of which are provided for convenience of description only.

Controller 10 processes the signals received from the various sensors to generate a throttle actuator control signal 170, a spark timing control signal 172, a fuel injector driver control signal 174, an intake valve timing control signal 176, and an exhaust valve timing control signal 178. A throttle actuator 180 moves throttle plate 104 in response to throttle actuator control signal 170. Spark plug 128 operates under control of spark timing control signal 172. Fuel injector 110 preferably takes the form of a solenoid valve and is capable to perform a split injection as well as a single injection in response to an injector control signal 182 received from an injector driver, not shown, which operates under control of fuel injector driver control signal 174 generated by controller 10. Valve controllers 124 and 126 operate under control of intake and exhaust valve timing control signals 176 and 178, respectively.

In spark ignition combustion mode, throttle actuator 180 moves throttle plate 104 in response to throttle actuator control signal 170 in a conventional manner to regulate flow rate of intake air as a function of operator power demand expressed through accelerator pedal 136. Spark plug 128 operates in a conventional manner in response to spark timing control signal 172 to ignite air/fuel mixture in combustion chamber 108 Fuel injector 110 receives fuel from a high-pressure fuel supply pump, not shown, and injects fuel directly into combustion chamber 108 in response to injection control signal 182. Inlet and outlet control devices 124 and 126 operate in response to intake and exhaust valve timing control signals 176 and 178, respectively, to provide valve timing for spark ignition combustion, in a conventional manner.

In auto-ignition combustion mode, throttle actuator 180 holds throttle plate 104 at wide open throttle position in response to throttle actuator control signal 170. Spark plug 128 ceases to operate. Fuel injector 110 may perform split injection as well as single injection in response to injection control signal 182. Inlet and outlet control devices 124 and 126 operate in response to intake and exhaust valve timing control signals 176 and 178, respectively, to provide valve timing for auto-ignition combustion. FIG. 2 provides, as an example, two valve lift diagrams for auto-ignition combustion. One lift diagram represented by curves 190 and 192 provides large or elongated exhaust gas retaining duration. The other lift diagram represented by curves 194 and 196 provides small or short exhaust gas retaining duration. In FIG. 2, EVO indicates exhaust valve opening (opening timing) of outlet control device 126. EVC indicates exhaust valve closure (closing timing) of outlet control device 126. IVO indicates intake valve opening (opening timing) of inlet control device 124. IVC indicates intake valve closure (closing timing) of inlet control device 124. The reference character "A" represents duration between EVC and TDC during exhaust process (stroke). The reference character "B" represents duration between TDC during exhaust process and IVO. Exhaust gas retaining duration may be defined as the sum A+B. Outlet control device 126 opens before bottom dead center (BDC) during expansion process (stroke) and closes before TDC during exhaust process. Inlet control device 124 opens after TDC of exhaust process and closes after BDC during induction process.

In auto-ignition combustion mode, inlet and outlet control devices 124 and 126 are adjusted to retain a portion of exhaust gas for subjecting the retained exhaust gas to compression during the last travel section of exhaust stroke of piston 116. The retained exhaust gas is used to cause an increase in temperature within cylinder, which provides advantageous influence on auto-ignition at around completion of compression process in the next engine cycle. The quantity of retained exhaust gas may be increased or decreased by adjusting an advance of EVC before TDC during exhaust process. In the preferred embodiment, a delay of IVO after TDC during exhaust process is varied in accordance with the variation of advance of EVC such that duration B is generally equal to duration A. However, varying IVO in a manner to correspond duration B exactly to duration A is not needed. Control scheme of IVO should be established to open inlet control device 124 at around a moment when almost all of work done by piston 116 to compress the retained exhaust gas has been transferred to energy to move piston 116 in the subsequent downward direction after TDC.

For understanding of auto-ignition of gasoline fuel by retaining exhaust gas, reference should be made to the commonly assigned pending U.S. patent application Ser. No. 09/767,025, filed Jan. 23, 2001, (now U.S. Pat. No. 6,386,177, issued May 14, 2002) entitled "SYSTEM AND METHOD FOR AUTO-IGNITION OF GASOLINE INTERNAL COMBUSTION ENGINE", and the commonly assigned pending U.S. patent application Ser. No. 09/813, 892, filed Mar. 22, 2001, (now U.S. Pat. No. 6,612,294, issued Sep. 2, 2003 entitled "AUTO-IGNITION OF GASOLINE ENGINE BY VARYING EXHAUST GAS RETAINING DURATION". The disclosure of each of these U.S. patent applications is hereby incorporated by reference in its entirety.

Adjusting the rotational phase of a camshaft or a cam-driving shaft relative to a crankshaft of an engine is a well-known technique to vary valve timing. Examples of valve controllers employing such technique are shown in U.S. Pat. No. 5,669,343 (Adachi), and U.S. Pat. No. 5836, 276 (Iwasaki et al.). It is also known to electromagentically operate a gas exchange valve. A valve controller employing this technique is shown in U.S. Pat. No. 5,785,016 (Enderle et al.).

Any one of the above listed valve controllers may be used in inlet and outlet control devices 124 and 126.

For understanding the recent implementation of the technique to vary valve timing, reference may be made to the commonly assigned pending U.S. patent application Ser. No. 09/934,588, filed Aug. 23, 2001, (now U.S. Pat. No. 6,513,467 issued Feb. 4, 2003) entitled "VARIABLE VALVE CONTROL DEVICE OF INTERNAL COMBUSTION ENGINE", which claims priority based on Japanese Patent Application No. 2000-262109 filed Aug. 31, 2000. The Application discloses in FIGS. 5–9 a phase adjusting mechanism for a gas exchange valve, which may be an intake valve or an exhaust valve. The disclosure of this pending U.S. Patent Application is hereby incorporated by reference in its entirety. The phase adjusting mechanism may be used in inlet and outlet control devices 124 and 126.

With reference now to FIG. 3, a method of the present invention is generally indicated at 200. At block 202, a parameter indicative of engine-surrounding environment is monitored. Inlet and outlet control devices 124 and 126 are adjusted to retain a portion of exhaust gas for subjecting the retained exhaust gas to compression. At block 204, closing timing EVC of outlet control device 126 is adjusted or varied in response to the monitored engine-surrounding environment indicative parameter, thereby to vary an exhaust gas retaining duration when there is a change in the monitored engine-surrounding environment indicative parameter.

The engine-surrounding environment parameter may be temperature of intake air, which may be detected by intake manifold temperature sensor 152. In this case, closing timing EVC of outlet control device 126 is moved in such a direction as to elongate exhaust gas retaining duration when the temperature of intake air drops. Measures of engine speed and load request determine an appropriate one of predetermined base values of exhaust gas retaining duration. Accelerator angular position detected by accelerator position sensor 134 may approximate load request. Such base values, which may be determined empirically or by computer simulation, provide appropriate in-cylinder temperature and excess air ratio around TDC during compression process for auto-ignition combustion under predetermined standard conditions. The predetermined standard conditions include a standard temperature of intake air and a standard pressure of intake air. Temperature of intake air varies with variation of temperature of atmospheric air. A drop in temperature of intake air with respect to the standard temperature of intake air causes a drop in temperature within the cylinder around TDC during compression process, causing a delay in initiation of auto-ignition, resulting in elongated combustion duration. Thermal efficiency drops and probability of misfire event increases. To prevent such a drop in temperature within the cylinder, the base value, which has been determined against load request and engine speed, needs to be corrected in response to the temperature of intake air. When the temperature of air drops, the base value can be corrected in such a direction as to elongate exhaust gas retaining duration. Advancing closing timing EVC elongates exhaust gas retaining duration, increasing the quantity of exhaust gas to be retained, causing an increase in thermal energy used for elevating temperature within the cylinder in the next engine cycle.

In auto-ignition combustion mode, the fuel injection device including fuel injector 110 may perform a split injection wherein a first injection event is separated from a second injection event and occurs during exhaust gas retaining duration. Fuel quantity for the first injection is a portion of the total fuel quantity to be injected into the cylinder. If the temperature of intake air drops, the fuel quantity for the first injection may be increased.

As mentioned before, a drop in temperature of intake air causes a drop in temperature within the cylinder around TDC during compression process. Increasing the quantity of fuel for the first injection causes an increase in density of fuel radicals around TDC during compression process, providing auto-ignition combustion at appropriate ignition timing with appropriate combustion duration. In this embodiment, elongation of exhaust gas retaining duration is not relied upon, thus cooling loss is suppressed to improve fuel economy.

Elongation of exhaust gas retaining duration may be combined with increasing of quantity of fuel for the first injection of split-injection to cope with a drop in temperature of intake air. This may be achieved by establishing an exhaust gas retaining duration threshold, comparing the current exhaust gas retaining duration to the exhaust gas retaining duration threshold, and increasing the fuel quantity for the first injection when the current exhaust gas retaining duration is longer than the exhaust gas retaining duration threshold. According to this, excessive increase in fuel radicals and in exhaust gas retaining duration is suppressed in coping with a drop in temperature of intake air. Cooling loss due to temperature elevation is therefore suppressed effectively.

With reference next to FIG. 4, a method of the present invention is generally indicated at 210. At block 212, a parameter indicative of engine-surrounding environment is monitored. Inlet and outlet control devices 124 and 126 are adjusted to retain a portion of exhaust gas for subjecting the retained exhaust gas to compression. At block 214, closing timing IVC of inlet control device 124 is adjusted or varied in response to the monitored engine-surrounding environment indicative parameter, thereby to vary volumetric efficiency.

The engine-surrounding environment indicative parameter may be pressure of intake air, which may be approximated with good precision by a result from detecting barometric pressure. In this case, closing timing IVC of inlet control device 124 is moved in such a direction as to increase the volumetric efficiency when the pressure of intake air drops. Where inlet control device 124 closes after BDC during induction process, varying a delay of closing timing IVC of inlet control device 124 after BDC is effective in varying the volumetric efficiency. Closing inlet control device 124 at early timing is effective in increasing the volumetric efficiency. A drop in pressure of intake air causes a drop in pressure within cylinder around TDC during compression process, causing a delayed and/or instable auto-ignition due to insufficient in-cylinder pressure as well as insufficient excess air ratio. To prevent such a drop in pressure within cylinder around TDC during compression process, closing timing IVC of inlet control device 124 is moved to increase volumetric efficiency when the pressure of intake air drops.

At high engine speeds and/or with low load request, auto-ignition is considered to be difficult to achieve. Even with the same setting of closing timing IVC of inlet control device 124, air charge inhaled during induction process may not be the same in quantity over varying engine speeds. If inlet control device 124 closes immediately after BDC during induction process, which is the case during low load engine operation, moving closing timing IVC of inlet control device 124 alone may not have expected influence on improvement in auto-ignition of air/fuel mixture within the cylinder.

In auto-ignition combustion mode, the fuel injection device including fuel injector 110 may perform a split injection wherein a first injection event is separated from a second injection event and occurs during exhaust gas retaining duration. Fuel quantity for the first injection is a portion of the total fuel quantity to be injected into the cylinder. If the pressure of intake air drops, the fuel quantity for the first injection may be increased in addition to adjustment of closing timing IVC of inlet control device 124. Increased density of fuel radicals works well to enhance ignitability even if auto-ignition is difficult to achieve owing to a drop in pressure of intake air.

The engine-surrounding environment indicative parameter may be mass flow rate of intake air, which may be detected by MAF sensor 142. In this case, the exhaust gas retaining duration is shortened when mass flow rate of intake air drops. A drop in mass flow rate causes a drop in excess air ratio within the cylinder around TDC during exhaust process. To prevent such a drop in excess air ratio, the exhaust gas retaining duration is shortened to decrease the residual gas content to increase the quantity of fresh air charge in the next engine cycle. Accordingly, occurrence of combustion noise, which is induced due to insufficient excessive air ratio, is suppressed.

In the place of or in addition to adjustment of exhaust gas retaining duration, closing timing IVC of inlet control device 124 may be moved in such a direction as to increase the volumetric efficiency when mass flow rate of intake air drops. If inlet control device 124 closes after BDC during induction process, advancing closing timing IVC of inlet control device 124 to decrease a delay from the BDC works to increase volumetric efficiency. Increasing volumetric efficiency in the manner causes an increase in fresh air charge inhaled during induction process, assisting in compensating for a drop in excessive air ratio due to a drop in mass flow rate.

Moving of closing timing IVC of inlet control device 124 may be combined with adjustment of exhaust gas retaining duration to cope with a drop in mass flow rate of intake air. This may be achieved by establishing an inlet control device closing timing threshold in response to engine speed, comparing the current closing timing IVC of inlet control device 124 to the inlet control device closing timing threshold, and moving closing timing EVC of outlet control device 126 in such a direction as to shorten exhaust gas retaining duration when closing timing IVC of inlet control device 124 has moved toward BDC during induction process beyond the inlet control device closing timing threshold. According to this, exhaust gas duration may be adjusted to vary fresh air charge in quantity even if movement of closing timing IVC of inlet control device 126 is limited due to different requirements against varying engine speeds.

With reference to FIG. 5, a method of the present invention is generally indicated at 220. At block 222, an engine operating temperature is monitored. Inlet and outlet control devices 124 and 126 are adjusted to retain a portion of exhaust gas for subjecting the retained exhaust gas to compression. At block 224, closing timing EVC of outlet control device 126 is adjusted or varied in response to the monitored engine operating temperature, thereby to vary an exhaust gas retaining duration when there is a change in the monitored engine operating temperature.

When the monitored engine operating temperature drops, closing timing EVC of outlet control device may be moved in such a direction as to elongate exhaust gas retaining duration. At cold start, temperature within cylinder around TDC during compression process is low, causing the mass of air charge to increase even if volumetric efficiency remains the same, resulting in overabundance of excess air within the cylinder. Under this condition, auto-ignition is delayed to provide undesired long combustion duration. To prevent such a drop in temperature within the cylinder around TDC during compression process, the exhaust gas retaining duration is elongated to elevate temperature within the cylinder.

As mentioned before, a split injection may be performed in auto-ignition combustion mode. Quantity of fuel for first injection event during exhaust gas retaining duration may be increased when engine operating temperature drops. Increasing of quantity of fuel for the first injection may be combined with elongation of exhaust gas retaining duration to cope with a drop in engine operating temperature. With this technique, without excessive elongation of exhaust gas retaining duration, which might lead to great cooling loss, ignitability of air/fuel mixture can be enhanced when in-cylinder temperature is low. Engine operating temperature may be represented by an engine oil temperature or an engine coolant temperature, which may be detected by engine coolant temperature sensor 148.

Temperature of exhaust gas has great influence on in-cylinder temperature and excessive air ratio around TDC during compression process. An increase in temperature of exhaust gas causes an increase in temperature of the retained exhaust gas, resulting in a reduction in fresh air charge and excessive air ratio in the next engine cycle. In-cylinder temperature around TDC during compression process increases due to elevation of in-cylinder temperature during exhaust gas retaining duration. Cycle-by-cycle variation of combustion has influence on temperature of exhaust gas, which exhaust gas temperature is influenced also by temperature of intake air and pressure of intake air. Temperature of exhaust gas may vary from one to another in the engine cycles particularly during transient period where load request and/or engine speed change, or at engine start where engine operating temperature changes. Such cycle-by-cycle variation in temperature of exhaust gas promotes cycle-by-cycle variation of combustion. Variation of auto-ignition timing and combustion period accompanies such cycle-by-cycle variation of combustion, causing occurrence of misfire event and knock event, which might bring about poor drivability. Appropriate measure to cope with variation of temperature of exhaust gas during transient period is needed for suppression of instable combustion event and knock event.

One measure is to adjust exhaust gas retaining duration when there is a change in temperature of exhaust gas. More specifically, exhaust gas retaining duration is elongated to cope with a drop in temperature of exhaust gas. Temperature of the retained exhaust gas drops, but its quantity increases, so that an increase in fresh air charge inhaled during induction process as well as the resultant increase in excess air due to drop of in-cylinder temperature is prevented.

Besides, increasing quantity of fuel for first injection during exhaust gas retaining duration is preferable when temperature of exhaust gas drops, increasing density of fuel radicals around TDC during compression process, thus enhancing ignitability.

With reference to FIG. 6, a method of the present invention is generally indicated at 230. At block 232, a predetermined window about a desired level of combustion stability within an engine is established. At block 234, an actual level of combustion stability within the engine is monitored. At block 236, the monitored actual level of combustion stability is compared to the predetermined window. At block 238, closing timing IVC of inlet control device 124 is adjusted in response to the comparison result, such that, when the monitored actual level falls outside of the predetermined window, the closing timing IVC is moved in such a direction as to bring the monitored actual level of combustion stability into the predetermined window.

Combustion stability has great influence on in-cylinder temperature and excessive air ratio around TDC during compression process. Termination of combustion varies considerably from one to another in number of engine cycles when combustion stability is found to be low or poor, so temperature of the retained exhaust gas varies accordingly on cycle-by-cycle basis, causing the quantity of air charge inhaled and in-cylinder temperature around TDC during compression process to vary accordingly on cycle-by-cycle basis. With regard to density of unburnt fuel within the retained exhaust gas, the density varies on cycle-by-cycle basis when combustion stability is low. The density of unburnt fuel within the retained exhaust gas determines density of fuel radicals generated during exhaust gas retaining duration. If much unburnt fuel exists, fuel radicals generated are sufficient in amount. If unburnt fuel is a little, fuel radicals generated are little or zero. In this manner, combustion event in one engine cycle affects combustion event in the next engine cycle in a manner to deteriorate combustion stability. Accordingly, a need remains to optimize in-cylinder pressure, in-cylinder temperature, and excess air ratio around TDC during compression stroke to hold the appropriate ignition timing and combustion duration against a drop in level of combustion stability.

A drop in level of combustion stability is induced by cycle-by-cycle variation of combustion duration and/or auto-ignition timing, which instable combustion events may occur during transient period where engine speed or load changes.

With exhaust gas retaining duration and closing timing IVC of inlet control device 124, which are appropriately set for engine speed and load, it is hardly difficult to suppress occurrence of instable combustion event or misfire event that are induced by variation in temperature of intake air and/or exhaust gas. Plural factors, each alone or in combination with another or other factors, are considered to induce instable combustion event. The inventors of this application have considered that, if instable combustion event has occurred, it would be practical to detect combustion stability rather than detecting factor or factors inducing such instable combustion event, for the subsequent optimization of conditions needed for appropriate auto-ignition combustion to take place.

Based on the above-mentioned recognition, the inventors have proposed, in one preferred embodiment, to adjust exhaust gas retaining duration and/or closing timing IVC of inlet control device 124 such that when the monitored actual level of combustion stability falls outside of the predetermined window, the exhaust gas retaining duration and/or the closing timing IVC are varied or moved in such a direction as to bring the monitored actual level of combustion stability into the predetermined window.

With regard to the adjustment of exhaust gas retaining duration, exhaust gas retaining duration is elongated when the monitored actual level of combustion stability falls outside of the predetermined window. Elongation of exhaust gas retaining duration leads to enhancement of ignitability by increasing in-cylinder temperature.

With regard to the adjustment of closing timing IVC of inlet control device 124, closing timing IVC is moved in such a direction as to increase volumetric efficiency when the monitored level of combustion stability falls outside of the predetermined window. In the case where inlet control device 124 closes after BDC during induction process, closing timing IVC is moved in such a direction as to decrease a delay from the BDC so as to increase volumetric efficiency. Increase in volumetric efficiency leads to increase of in-cylinder pressure around TDC during compression process.

Quantity of fuel for first injection during exhaust gas retaining duration may also be increased when the monitored actual level of combustion stability falls outside of the predetermined window.

With reference now to FIG. 7, a combustion mode selection (CMS) map illustrates an auto-ignition combustion range separated from a spark-ignition combustion range. In FIG. 7, the horizontal axis represents engine speed (=rotational speed of the engine crankshaft) and the vertical axis represents load request (=accelerator pedal angular position expressed in terms of percent of angle, which the accelerator pedal assumes at the fully depressed position). Viewing in FIG. 7, a horizontal line segment 252 and a horizontal line segment 254 are connected to each other at one ends, with their other ends interconnected by a convex curved line segment 250, thereby to define an area consisting of operation points where stable auto-ignition combustion can be achieved according to the present invention. The spark-ignition combustion range occupies operation points where spark-ignition combustion is preferred.

Desired values of total fuel quantity to be injected into cylinder per one engine cycle may be determined against various values of load request and engine speed. The inventors of this application have recognized that, in auto-ignition combustion mode, there exist optimum exhaust gas retaining duration and optimum closing timing IVC (Intake Valve Closure) of inlet control device 124 for achieving desired auto-ignition combustion of the injected fuel during a stable state operation of engine with a given set of load request and engine speed under predetermined standard engine-surrounding environment conditions. Such optimum values of exhaust gas duration have been predetermined through experiments and/or computer simulation as base values of exhaust gas retaining duration constituting an exhaust gas retaining duration database. Similarly, such optimum values of closing timing IVC of inlet control device 124 have been predetermined as base values of IVC constituting an IVC database.

Figure 8A:
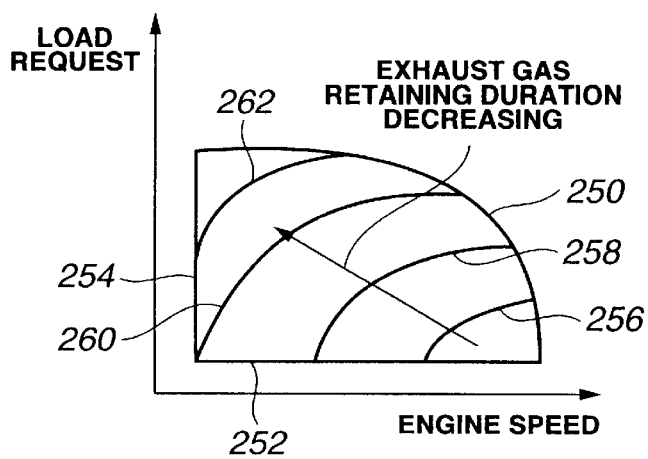
FIG. 8(A) is a fragmentary view of FIG. 7 with lines, each drawn through all points of equal exhaust gas retaining duration, illustrating a so-called "exhaust gas retaining duration database" consisting of various values of exhaust gas retaining duration, as "base values", against varying values of engine speed and load request, each of which base values has been predetermined as indicating the optimum exhaust gas retaining duration for achieving desired auto-ignition combustion during stable state operation of the engine with a given combination of engine speed and load request under predetermined standard engine-surrounding environment conditions.

With reference to FIG. 8(A), the reference numerals 256, 258, 260, and 262 indicate representative ones of lines, each drawn through all points of equal exhaust gas retaining duration, illustrating the exhaust gas retaining duration database. As mentioned above, this database consists of various values of exhaust gas retaining duration, as base values, against varying values of engine speed and load request. Each base value indicates the optimum exhaust gas retaining duration for achieving desired auto-ignition combustion during stable state operation of the engine with a given combination of engine speed and load request under the predetermined standard engine-surrounding environment conditions. In FIG. 8(A), as indicated by an arrow, exhaust gas retaining duration becomes short or decreases as load request increases and/or engine speed decreases. In other words, exhaust gas retaining duration becomes long or increases as load request decreases and/or engine speed increases.

With regard to the IVC database, each of the base values indicates the optimum closing timing IVC of inlet control device 124 for providing volumetric efficiency required to establish the optimum excess air ratio in the cylinder around TDC during compression process during stable engine operation with a given combination of load request and engine speed under the predetermined engine-surrounding environment conditions.

The inventors of this application have recognized that a split-injection is preferred within a portion of auto-ignition combustion range, and there exist fuel quantity for first injection event during exhaust gas retaining duration for achieving desired auto-ignition at appropriate timing during stable state operation of engine with a given set of load request and engine speed under the predetermined standard engine-surrounding environment conditions. Such optimum values of fuel quantity have been predetermined through experiments and/or computer simulation as base values of fuel quantity for first injection constituting a first injection fuel quantity database With reference to FIG. 8(B), the injection mode selection map illustrates a split-injection mode separated from a single-injection mode by a curve 254. The reference numerals 266 and 268 indicate representative ones of lines, each drawn through all points of equal fuel quantity for first injection event during exhaust gas retaining duration in the split-injection mode, illustrating the first injection fuel quantity database. This database consists of various values of fuel quantity for first injection, as base values, against varying values of engine speed and load request. Each base value indicates the optimum fuel quantity for achieving desired auto-ignition combustion in a stable state with a given combination of engine speed and load request during stable state operation of the engine under the predetermined standard engine-surrounding environment conditions.

Figure 9A:
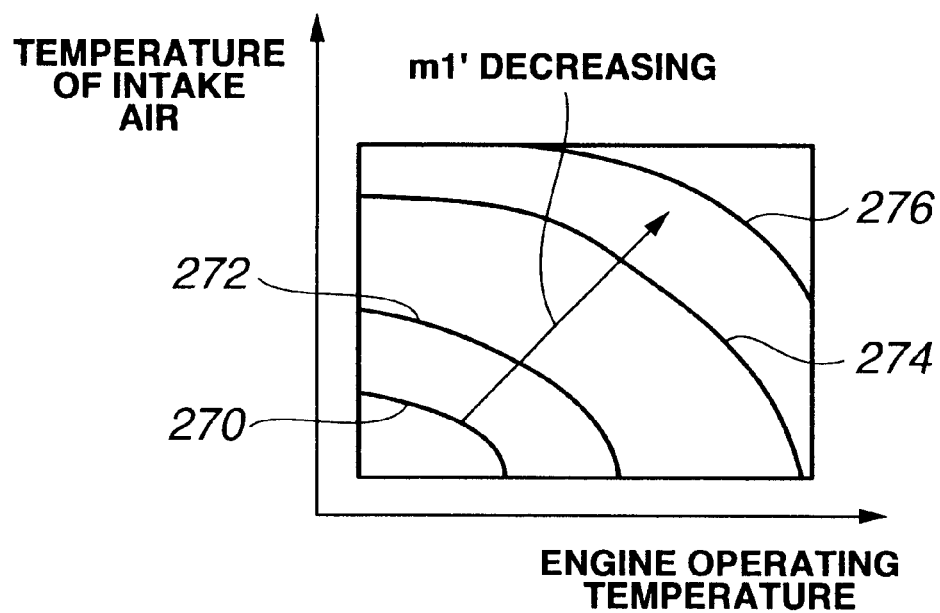
FIG. 9(A) is a map with lines, each drawn through all points of equal value of a correction coefficient factor m1', illustrating the variation of m1' against varying values of an engine operating temperature and a temperature of intake air.
Figure 10:
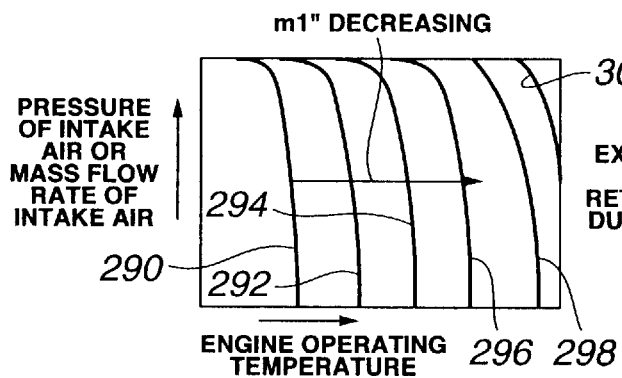
FIG. 10(A1) is a map with lines, each drawn through all points of equal value of a correction coefficient factor m1", illustrating the variation of m1" against varying values of engine operating temperature and pressure of intake air (or mass flow rate of intake air).
Figure 10:
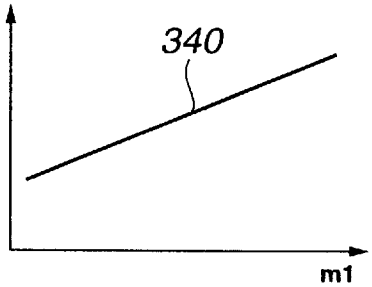
Figure 10:
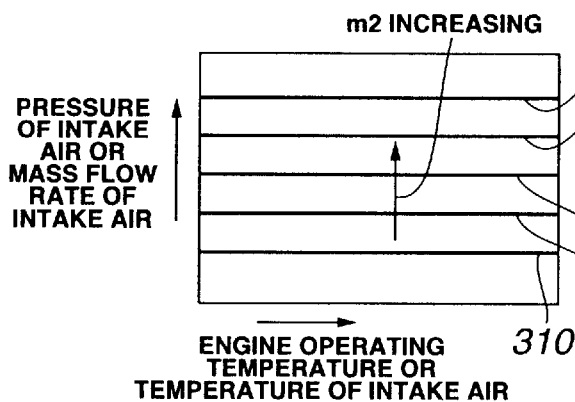
Figure 10:
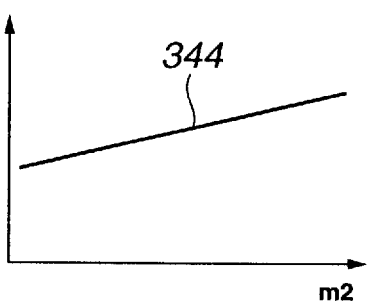
Figure 10:
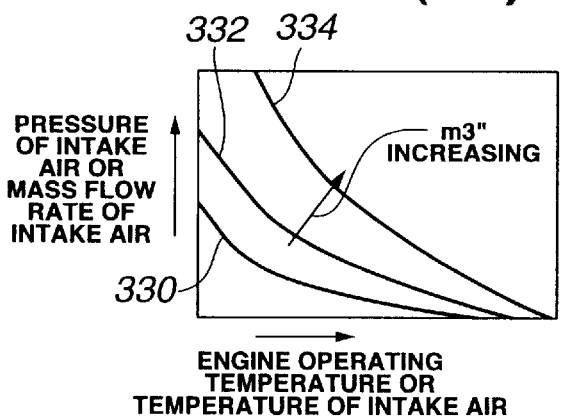
Figure 10:
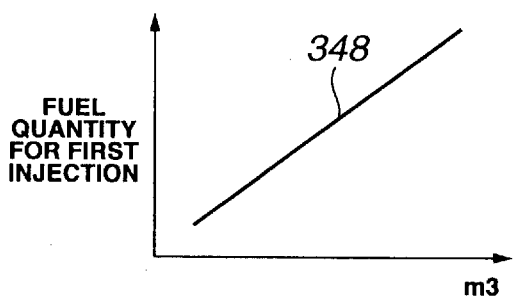

With reference to FIGS. 9(A), 10(A1), and 10(A2), a correction coefficient m1 for exhaust gas retaining duration is determined as a product of first and second correction factors m1' and m1". Values of correction factor m1' may be found in FIG. 9(A) using engine operating temperature as detected by engine coolant temperature sensor 148 and temperature of intake air as detected by intake manifold temperature sensor 152. Values of correction factor m1" may be found in FIG. 10(A1) using engine operating temperature and pressure of intake air (or mass flow rate of intake air as detected by MAF sensor 140). FIG. 9(A) provides a map with representative ones 270, 272, 274, and 276 of lines, each drawn through all points of equal value of correction factor m1' and illustrates the variation of m1' against varying values of engine operating temperature and temperature of intake air. In FIG. 9(A), as indicated by an arrow, correction factor m1' decreases as engine operating temperature increases and/or temperature of intake air increases. FIG. 10(A1) provides a map with representative ones 290, 292, 294, 296, 298, and 300 of lines, each drawn through all points of equal value of correction factor m1" and illustrates the variation of m1" against varying values of engine operating temperature and pressure of intake air (or mass flow rate of intake air). In FIG. 10(A1), as indicated by an arrow, correction factor m1" decreases as engine operating temperature increases and/or pressure of intake air (or mass flow rate of intake air) increases. Multiplying factor m1' with factor m1" gives correction coefficient m1. In FIG. 10(A2), the horizontal axis represents correction coefficient m1, while the vertical axis represents exhaust gas retaining duration. Line 340 indicates a characteristic of exhaust gas retaining duration versus correction coefficient m1.

With reference to FIGS. 9(A), 10(A1), and 10(A2), a correction coefficient m1 for exhaust gas retaining duration is determined as a product of first and second correction factors m1' and m1". Values of correction factor m1' may be found in FIG. 9(A) using engine operating temperature as detected by engine coolant temperature sensor 148 and temperature of intake air as detected by intake manifold temperature sensor 152. Values of correction factor m1" may be found in FIG. 10(A1) using engine operating temperature and pressure of intake air (or mass flow rate of intake air as detected by MAF sensor 140). FIG. 9(A) provides a map with representative ones 270, 272, 274, and 276 of lines, each drawn through all points of equal value of correction factor m1' and illustrates the variation of m1' against varying values of engine operating temperature and temperature of intake air. In FIG. 9(A), as indicated by an arrow, correction factor m1' decreases as engine operating temperature increases and/or temperature of intake air increases. FIG. 10(A1) provides a map with representative ones 290, 292, 294, 296, 298, and 300 of lines, each drawn through all points of equal value of correction factor m1" and illustrates the variation of m1" against varying values of engine operating temperature and pressure of intake air (or mass flow rate of intake air). In FIG. 10(A1), as indicated by an arrow, correction factor m1" decreases as engine operating temperature increases and/or pressure of intake air (or mass flow rate of intake air) increases. Multiplying factor m1' with factor m1" gives correction coefficient m1. In FIG. 10(A2), the horizontal axis represents correction coefficient m1, while the vertical axis represents exhaust gas retaining duration. Line 340 indicates a characteristic of exhaust gas retaining duration versus correction coefficient m1.

With reference to FIGS. 10(B1) and 10(B2), a correction coefficient m2 for IVC is determined. Values of correction coefficient m2 may be found in FIG. 10(B1) using engine operating temperature (or temperature of intake air) and pressure of intake air (or mass flow rate of intake air). FIG. 10(B1) provides a map with representative ones 310, 312, 314, 316, and 318 of lines, each drawn through all points of equal value of correction coefficient m2 and illustrates the variation of m2 against varying values of engine operating temperature (or temperature of intake air) and pressure of intake air (or mass flow rate of intake air). In FIG. 10(B1), as indicated by an arrow, correction coefficient m2 increases as pressure of intake air (or mass flow rate of intake air) increases. In FIG. 10(B2), the horizontal axis represents correction coefficient m2, while the vertical axis represents delay of IVC from BDC during induction process. Line 344 indicates a characteristic of IVC delay versus correction coefficient m2.

Figure 9B:
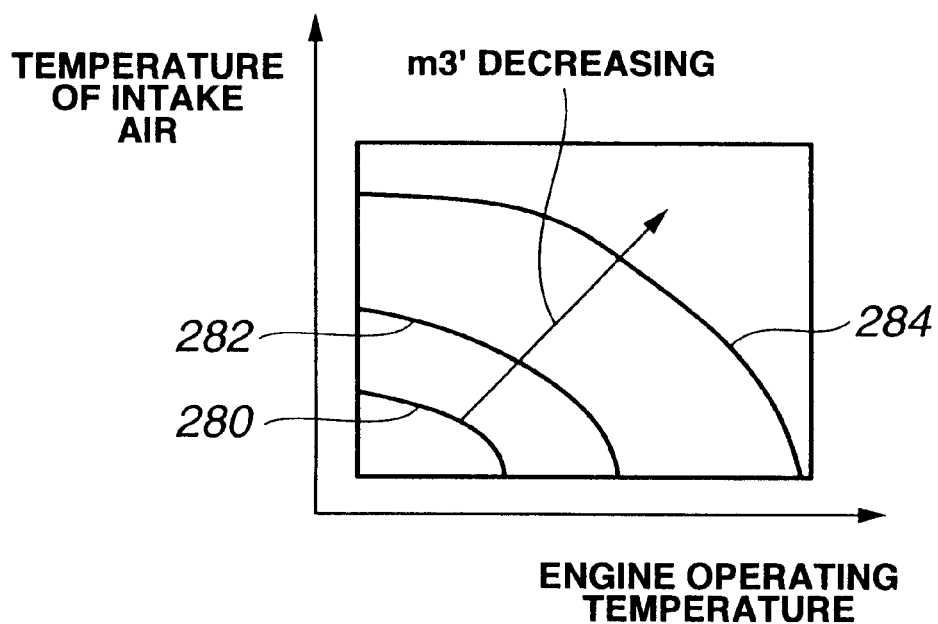
FIG. 9(B) is a map with lines, each drawn through all points of equal value of a correction coefficient factor m3', illustrating the variation of m3' against varying values of engine operating temperature and temperature of intake air.

With reference to FIGS. 9(B), 10(C1), and 10(C2), a correction coefficient m3 for fuel quantity for first injection is determined as a product of third and fourth correction factors m3' and m3". Values of correction factor m3' may be found in FIG. 9(B) using engine operating temperature and temperature of intake air. Values of correction factor m3" may be found in FIG. 10(C1) using engine operation temperature (or temperature of intake air) and pressure of intake air (or mass flow rate of intake air). FIG. 9(B) provides a map with representative ones 280, 282, and 284 of lines, each drawn through all points of equal value of correction factor m3" and illustrates the variation of m3" against varying values of engine operating temperature and temperature of intake air. In FIG. 9(B), as indicated by an arrow, correction factor m3' decreases as engine operating temperature increases and/or temperature of intake air increases. FIG. 10(C1) provides a map with representative ones 330, 332, and 334 of lines, each drawn through all points of equal value of correction factor m3" and illustrates the variation of m3" against varying values of engine operating temperature (or temperature of intake air) and pressure of intake air (or mass flow rate of intake air). In FIG. 10(C1), as indicated by an arrow, correction factor m3" increases as engine operating temperature (or temperature of intake air) increases and/or pressure of intake air (or mass flow rate of intake air) increases. Multiplying factor m3' with factor m3" gives correction coefficient m3. In FIG. 10(C2), the horizontal axis represents correction coefficient m3, while the vertical axis represents fuel quantity for first injection. Line 348 indicates a characteristic of fuel quantity for first injection versus correction coefficient m3.

Figure 11:
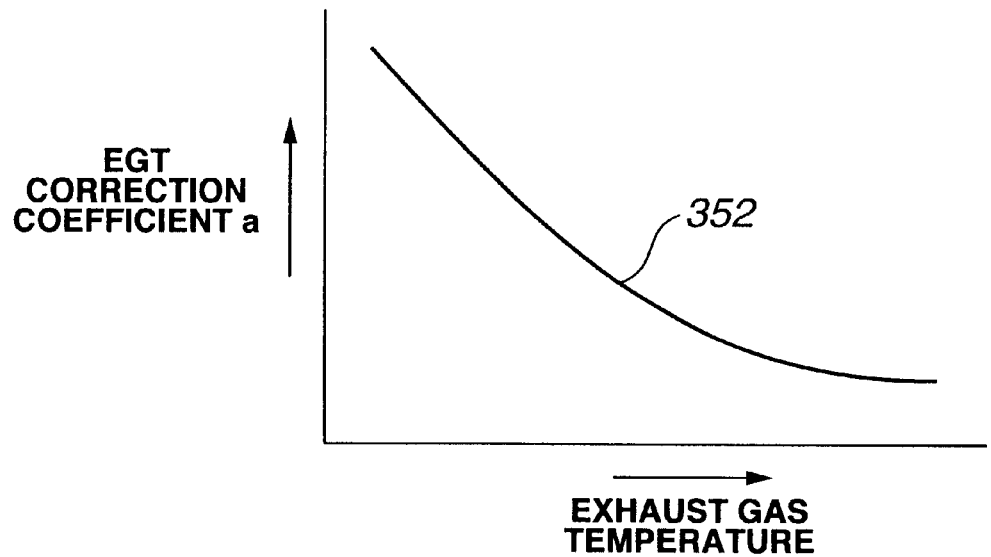
FIG. 11 illustrates the variation of an exhaust gas temperature (EGT) correction coefficient a against varying values of exhaust gas temperature.

With reference to FIG. 11, line 352 indicates the variation of an exhaust gas temperature (EGT) correction coefficient a. Line 352 clearly indicates that EGT correction coefficient a increases as exhaust gas temperature decreases.

Figure 12:
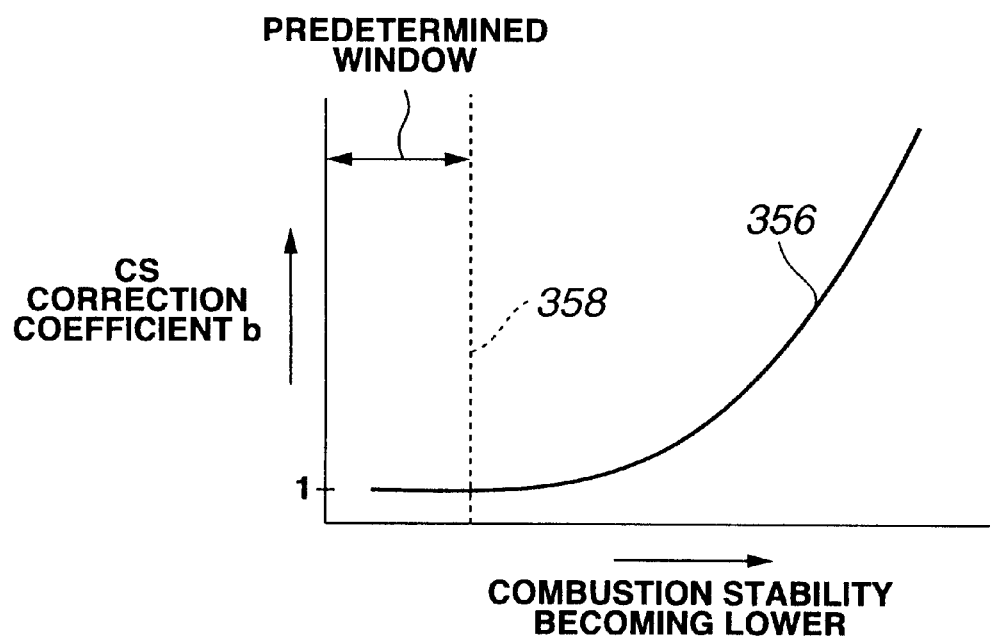
FIG. 12 illustrates the variation of combustion stability (CS) correction coefficient b against varying levels of combustion stability together with a predetermined window about a desired level of combustion stability.

With reference to FIG. 12, line 356 indicates the variation of combustion stability (CS) correction coefficient b against varying levels of combustion stability. Also shown in FIG. 12 is a predetermined window about a desired level of combustion stability. The predetermined window is limited at a level as indicated by a dotted vertical line 358. CS correction coefficient b is 1 (one) when the level of combustion stability falls in the window. If the level of combustion stability falls outside of the window, the level of combustion stability is low. CS correction coefficient increases from 1 (one) as a deviation of the level of combustion stability from the window increases The correction coefficients m1, m2, and m3 as well as EGT correction coefficient a and CS correction coefficient b are used in a control logic illustrated by block diagrams of FIGS. 13 to 15. The CS correction coefficient b only is used in another control logic illustrated by control diagrams of FIGS. 16 to 18.

Figure 13:
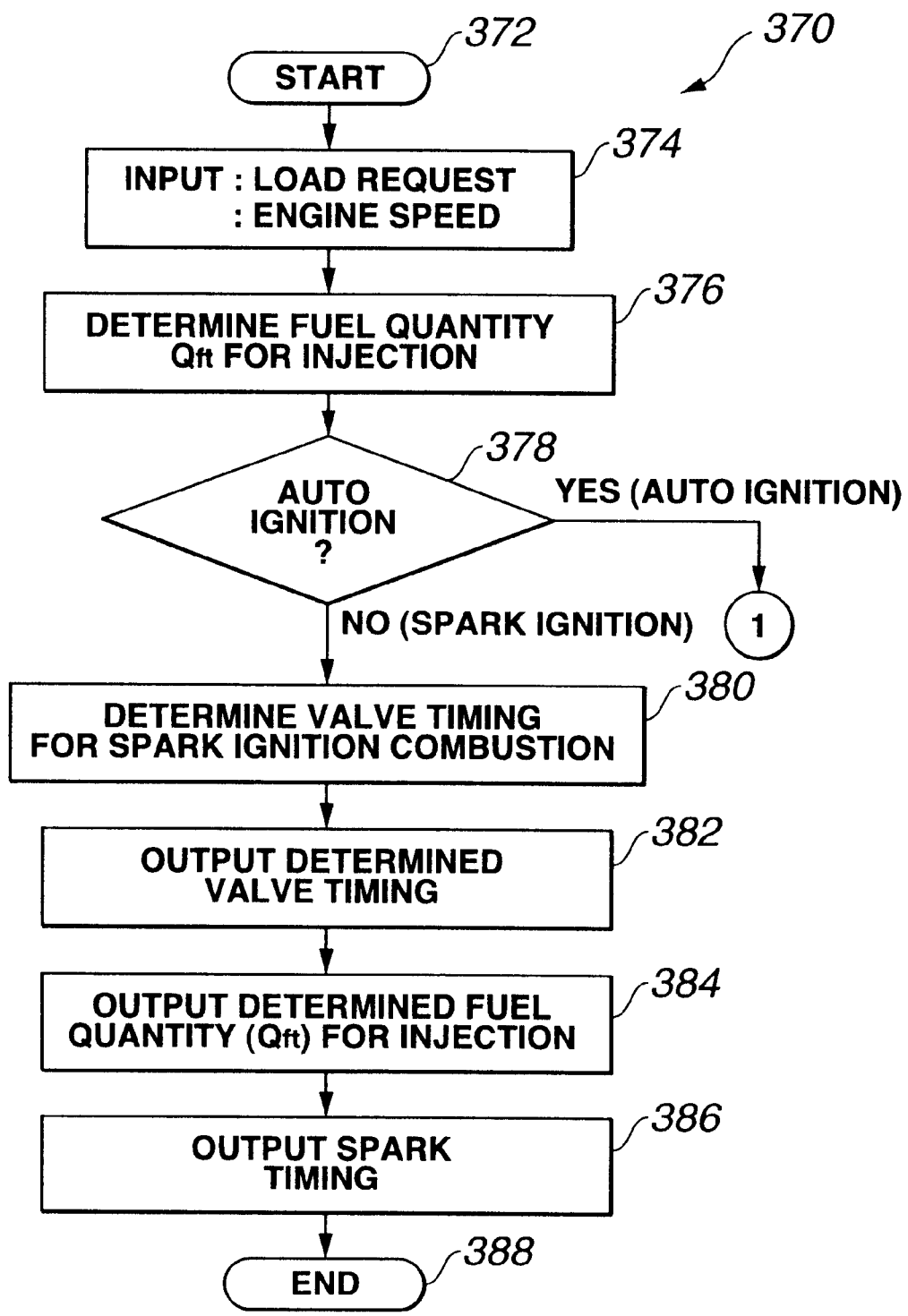
FIG. 13 is a portion of a flowchart showing a preferred control implementation of the present invention.
Figure 14:
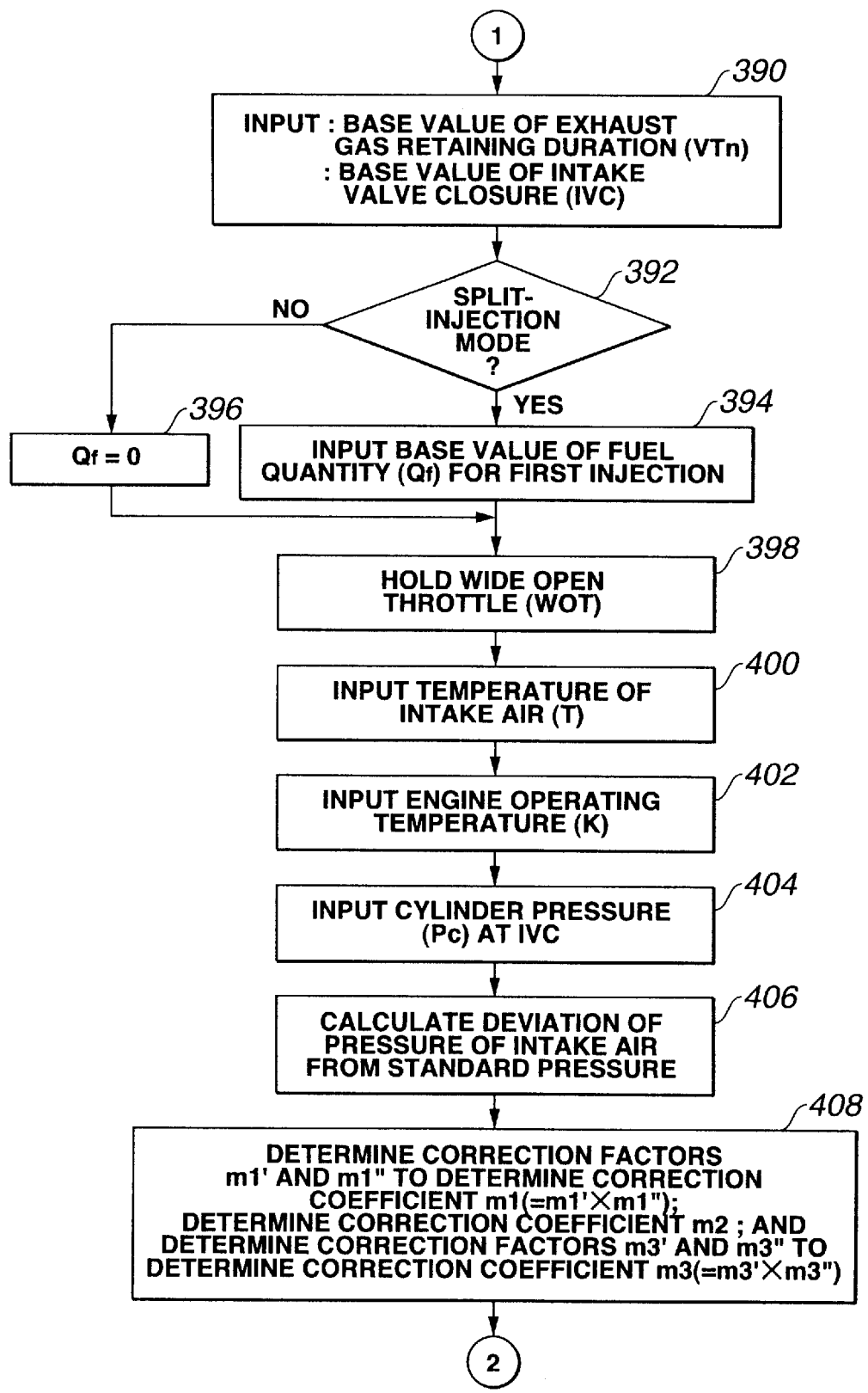
FIG. 14 is another portion of the flowchart showing the preferred control implementation.
Figure 15:
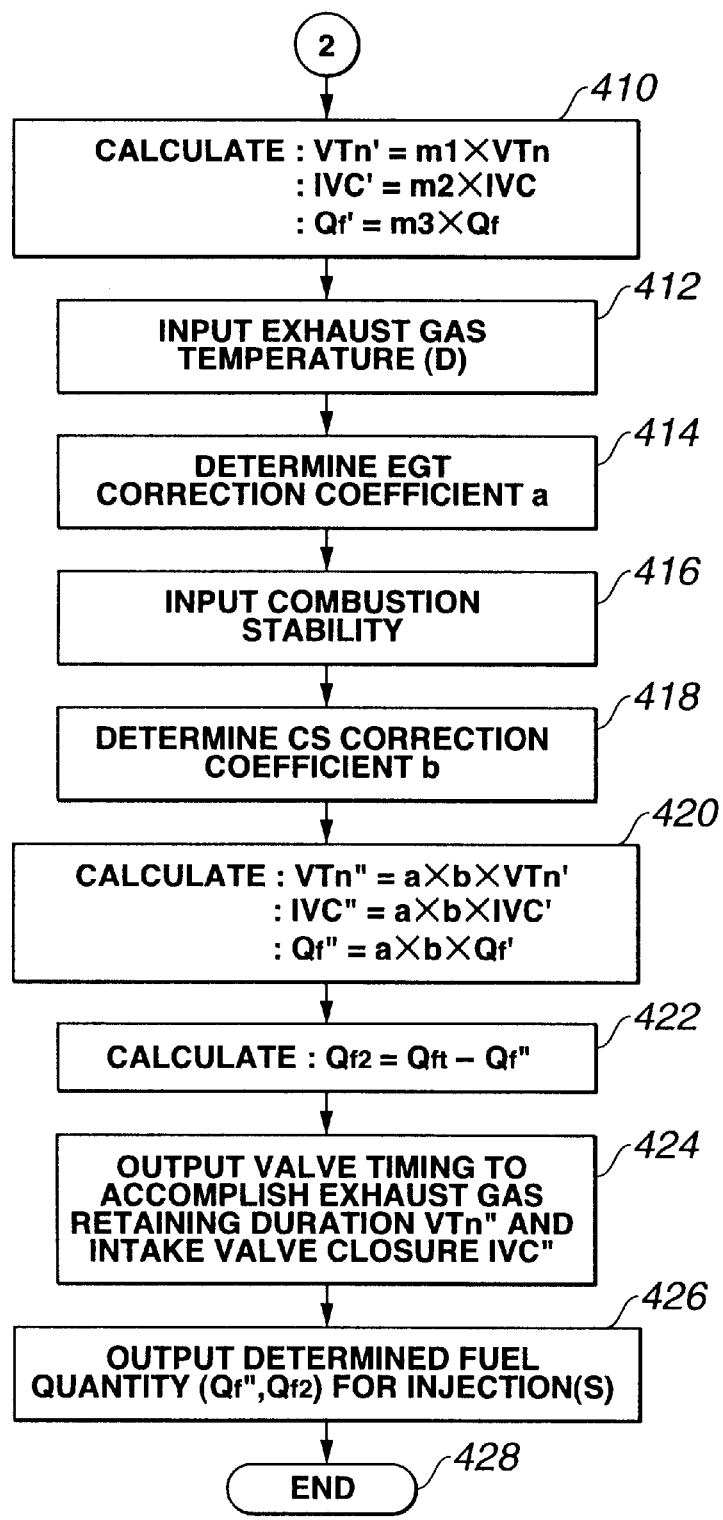
FIG. 15 is the other portion of the flowchart showing the preferred control implementation.

An example of how controller 10 would implement the present invention can be understood with reference to the flowchart shown in FIGS. 13 to 15. FIGS. 13 to 15 show steps executed by controller 10 to implement the engine control routine. With reference to FIG. 13, the engine control routine, generally designated at 370, is started at 372. At step 374, the controller 10 inputs load request on the engine and engine speed. At step 376, the total fuel quantity Qft to be injected is determined. At step 378, controller 10 makes a determination whether or not auto-ignition combustion range is preferred. Using engine speed and load request, reference is made to FIG. 7 to make the above-mentioned determination. If it is determined that auto-ignition combustion is preferred, the routine proceeds to a connector designated at 1. If it is determined that spark ignition combustion is preferred, the routine proceeds to step 380.

At step 380, controller 10 determines valve timing for spark ignition combustion. At step 382, controller 10 outputs the determined valve timing. At step 384, controller 10 outputs the determined total fuel quantity Qft for injection. At step 386, controller 10 outputs spark timing. The control routine is ended at 388.

With reference to FIG. 14, the control routine proceeds to step 390 if it is determined, at step 378, that auto-ignition combustion is preferred. At step 390, controller 10 inputs a base value of exhaust gas retaining duration VTn and a base value of intake valve closure IVC. Using load request and engine speed, controller 10 looks into the before-mentioned exhaust gas retaining duration database as illustrated in FIG. 8(A) to find the base value VTn. Similarly, using load request and engine speed, controller 10 looks into the before-mentioned IVC database to find the base value IVC.

Figure 8B:
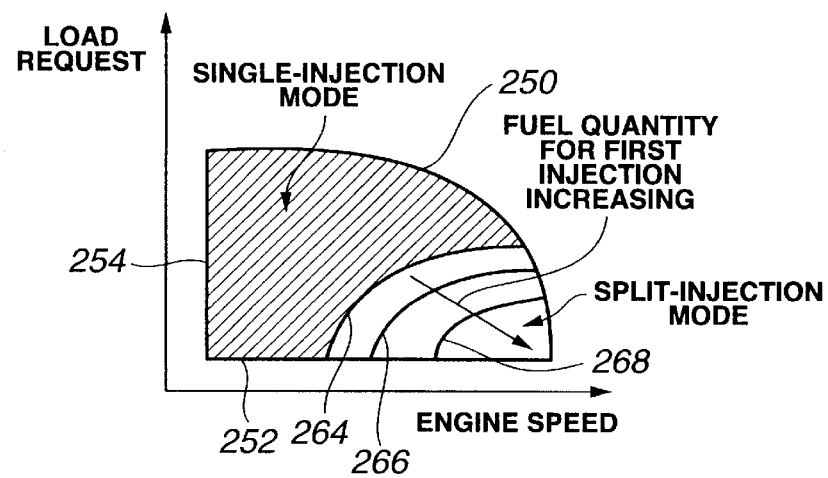
FIG. 8(B) is a view, similar to FIG. 8(A), of a so-called "injection mode selection map" illustrating a split-injection mode separated from a single-injection mode as well as lines, each drawn through all points of equal fuel quantity for a first injection event during exhaust gas retaining duration in the split-injection mode, illustrating a so-called "first injection fuel quantity database" consisting of various values of fuel quantity for first injection, as "base values", against varying values of engine speed and load request, each of which base values has been predetermined as indicating the optimum fuel quantity for achieving desired auto-ignition combustion during stable state operation of the engine with a given combination of engine speed and load request under predetermined standard engine-surrounding environment conditions.

At step 392, controller 10 makes a determination whether or not a split-injection mode is preferred. Using load request and engine speed, controller 10 refers to FIG. 8(B) to make this determination. In split-injection mode, the control routine proceeds to step 394, while, in single-injection mode, the control routine proceeds to step 396. At step 394, controller 10 inputs a base value of fuel quantity Qf for first injection. Using load request and engine speed, controller 10 looks into the first injection fuel quantity database as illustrated in FIG. 8(B) to find the base value Qf If split-injection mode is not preferred at step 392, controller 10 sets the base value Qf equal to 0 (zero).

At step 398, controller 10 holds throttle plate 104 at the wide open throttle (WOT) position. At step 400, controller 10 inputs temperature of intake air T. At step 402, controller 10 inputs engine operating temperature K. At step 404, controller 10 inputs in-cylinder pressure Pc when inlet control device 124 closes at IVC. At step 406, controller 10 determines pressure of intake air and calculates deviation of the determined pressure of intake air from standard pressure that is included by the standard engine-surrounding environment conditions.

At step 408, controller 10 determines correction coefficients m1, m2, and m3. In determining correction coefficient m1, controller 10 looks into FIG. 9(A) using temperature of intake air T and engine operating temperature K to find correction factor m1', and also into FIG. 10(A1) using the calculated deviation of pressure of intake air and engine operating temperature K to find correction factor m1". Controller 10 multiplies correction factor m1' with correction factor m1" to give correction coefficient m1. In determining correction coefficient m2, controller 10 looks into FIG. 10(B1) using the calculated deviation of pressure of intake air and engine operating temperature K. In determining correction coefficient m3, controller 10 looks into FIG. 9(B) using temperature of intake air T and engine operating temperature K to find correction factor m3', and also into FIG. 10(C1) using the calculated deviation of pressure of intake air and engine operating temperature K to find correction factor m3". Controller 10 multiplies correction factor m3' with correction factor m3" to give correction coefficient m3. Control routine proceeds to a connector designated at 2.

With reference to FIG. 15, control routine proceeds to step 410 from connector 2. At step 410, controller 10 calculates VTn', IVC', and Qf', which are expressed as:

$$VTn' = m1 \times VTn$$

$$IVC' = m2 \times IVC$$

$$Qf' = m3 \times Qf.$$

At step 412, controller 10 inputs exhaust gas temperature D. At step 414, controller 10 determine EGT correction coefficient a. In determining EGT correction coefficient a, controller 10 looks into FIG. 11 using exhaust gas temperature D. At step 416, controller 10 inputs actual level of combustion stability. At step 418, controller 10 determines CS correction coefficient b. In determining CS correction coefficient b, controller 10 looks into FIG. 12 using the actual level of combustion stability.

At step 420, controller 10 calculates VTn", IVC", and Qf", which are expressed as:

$$VTn'' = a \times b \times VTn'$$

$$IVC'' = a \times b \times IVC'$$

$$Qf'' = a \times b \times Qf'$$

At step 422, controller 10 calculates fuel quantity for second injection Qf2, which is expressed as:

$$Qf2 = Qft - Qf''.$$

At step 424, controller 10 outputs valve timing to accomplish exhaust gas retaining duration VTn" and intake valve closure IVC". At step 426, the controller 10 outputs the determined fuel quantities Qf" and Qf2. Control routine is ended at 428.

Figure 16:
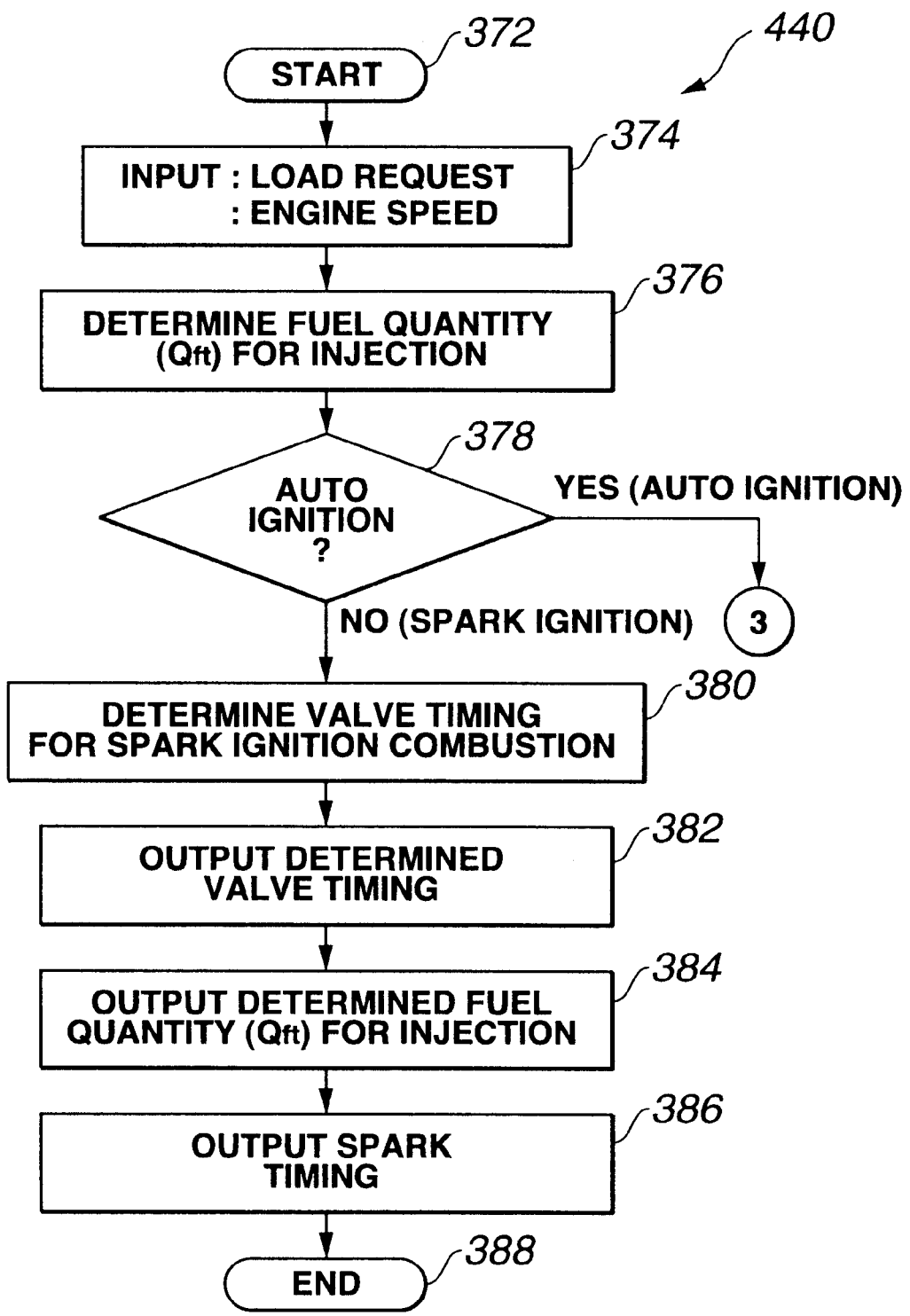
FIG. 16 is a portion of a flowchart showing a second preferred control implementation of the present invention.
Figure 17:
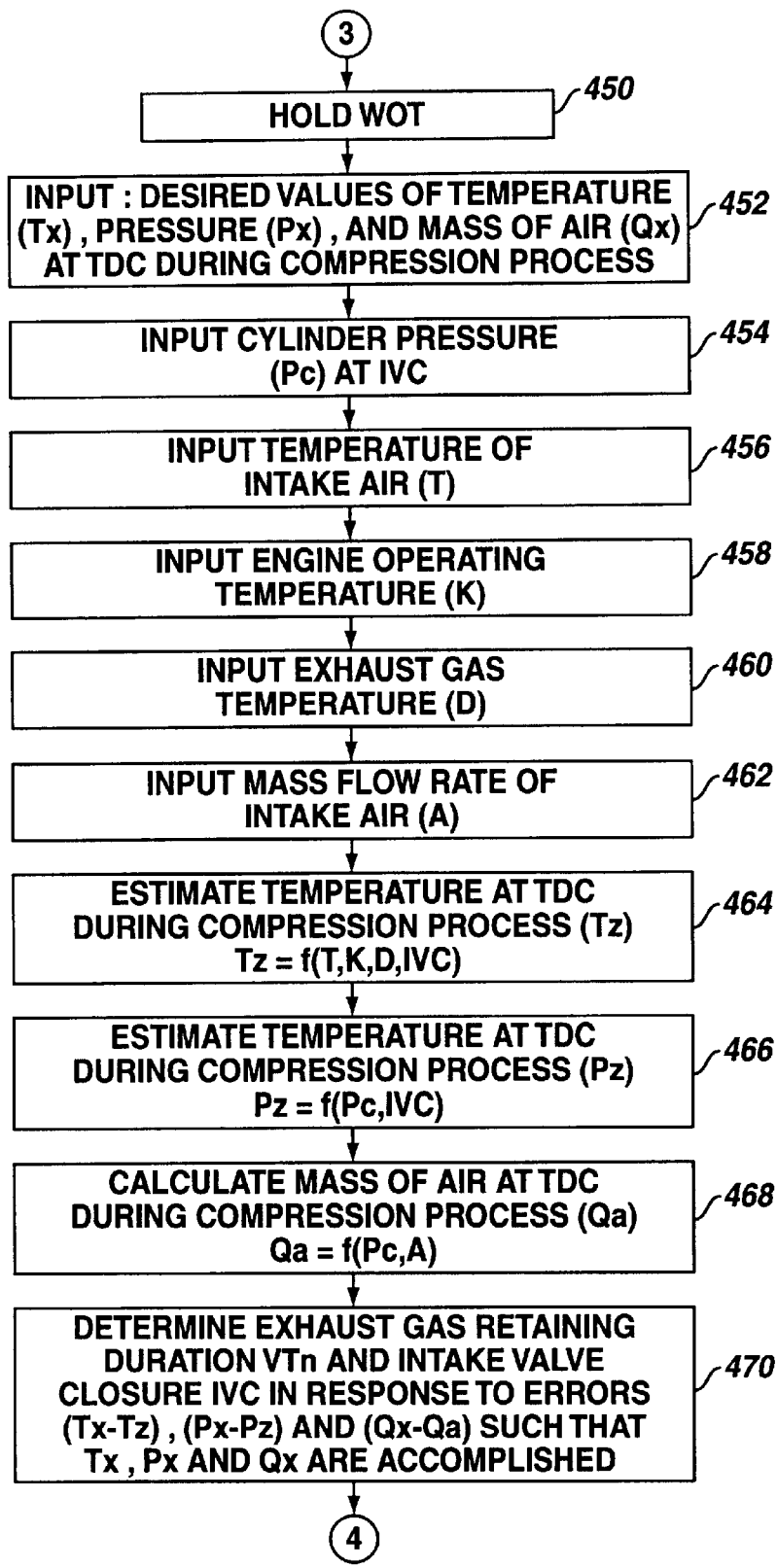
FIG. 17 is another portion of the flowchart showing the second preferred control implementation.
Figure 18:
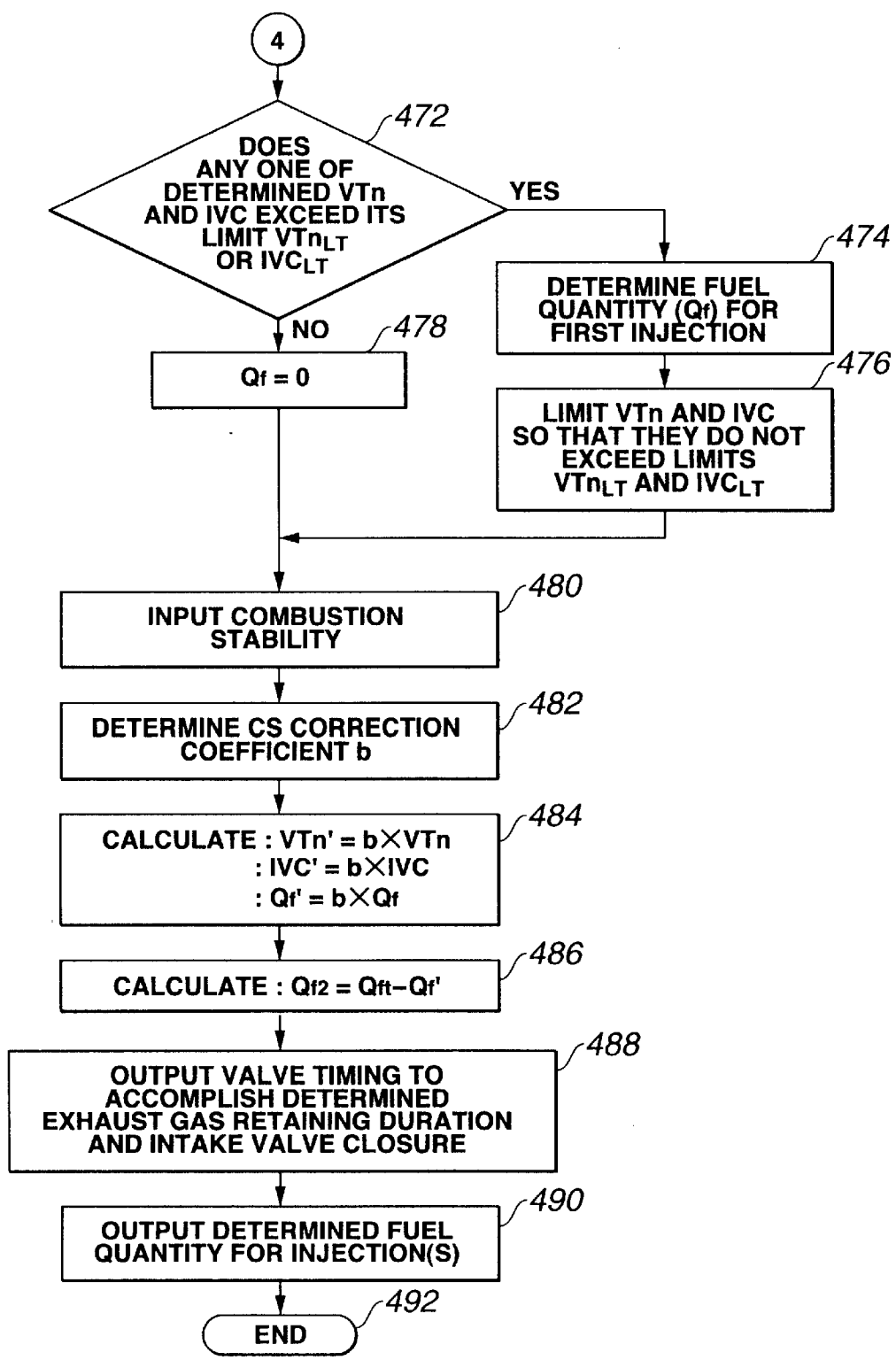
FIG. 18 is the other portion of the flowchart showing the second preferred control implementation.

Another example of how controller 10 would implement the present invention can be understood with reference to the flowchart shown in FIGS. 16 to 18. FIGS. 16 to 18 show steps executed by controller 10 to implement the engine control routine. With reference to FIG. 16, the engine control routine is generally designated at 440. Control logic along steps of routine 440 shown in FIG. 16 is the same as the control logic along the steps of routine 370 shown in FIG. 13. Thus, the like reference numerals are used in FIGS. 13 and 16 to designate like steps for the sake of brevity of description of control routine 440. In FIG. 16, if, at step 378, auto-ignition combustion is preferred, the routine proceeds via connector 3 to step 450 in FIG. 17.

With reference to FIG. 17, at step 450, controller 10 holds throttle plate 104 at the WOT position. At step 452, controller inputs a desired value of in-cylinder temperature Tx around TDC during compression process, a desired value of in-cylinder pressure Px around TDC during compression process, and a desired value of mass of air Qx within the cylinder around TDC during compression process. Using load request and engine speed, controller 10 find these values by looking into the respective databases or maps.

At step 454, controller 10 inputs in-cylinder pressure Pc when inlet control device 124 closes at IVC. At step 456, controller 10 inputs temperature of intake air T. At step 458, controller 10 inputs engine operating temperature K. At step 460, controller 10 inputs exhaust gas temperature D. At step 462, controller inputs mass flow rate of intake air A.

At step 464, controller 10 estimates in-cylinder temperature around TDC during compression process Tz, which may be expressed as a function of T, K, C, and IVC as follows:

$$Tz=f(T, K, D, IVC).$$

At step 466, controller 10 estimates in-cylinder temperature around TDC during compression process Pz, which may be expressed as a function of Pc and IVS as follows:

$$Pz=f(Pc, IVC).$$

At step 468, controller 10 calculates mass of air within the cylinder around TDC during compression process Qa, which may be expressed as:

$$Qa=f(Pc, A).$$

At step 470, controller 10 determines exhaust gas retaining duration VTn and intake valve closure IVC in response to erros (Tx–Tz), (Px–Pz), and (Qx–Qa), such that Tx, Px, and Qx are accomplished. The control routine proceeds to step 472 via a connector designated at 4.

With reference to FIG. 18, at step 472, controller 10 determines whether or not the determined VTn and IVC exceed the respective limits $VTn_{LT}$ and $IVC_{LT}$. The limit $IVC_{LT}$ may have various values in terms of a delay from BDC during induction process against varying values of engine speed. If, at step 472, any one of the limits $VTn_{LT}$ and $IVC_{LT}$ is exceeded, the routine proceeds to step 474 and 476 to prepare for split-injection where injection event occurs during exhaust gas retaining duration.

At step 474, controller 10 determines fuel quantity Qf for first injection. This determination may be made by looking into a map similar to FIG. 8(B) using load request and engine speed. At step 476, controller 10 limits VTn and IVC such that if $VTn>VTn_{LT}$, $VTn=VTn_{LT}$, and if $IVC>IVC_{LT}$, $IVC=IVC_{LT}$.

If, at step 472, the limits $VTn_{LT}$ and $IVC_{LT}$ are not exceeded, the routine proceeds to step 478. At step 478, controller 10 sets Qf equal to 0 (zero).

At the next step 480, controller 10 inputs actual level of combustion stability. At step 482, controller 10 looks into FIG. 12 using the actual level of combustion stability to determine CS correction coefficient b. At step 484, controller 10 calculates VTn', IVC', and Qf', which are expressed as follows:

$$VTn'=b \times VTn$$

$$IVC'=b \times IVC$$

$$Qf'=b \times Qf.$$

At step 486, controller calculates fuel quantity Qf2 for second injection, which is expressed as:

$$Qf2=Qft-Qf.$$

At step 488, controller 10 outputs valve timing to accomplish the exhaust gas retaining duration VTn' and intake valve closure IVC'. At step 490, controller 10 outputs fuel quantities Q' and Gf2. The control routine is ended at 492.

While the present invention has been particularly described, in conjunction with preferred implementations and embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Applications No. 2000-319361, filed Oct. 19, 2000, the disclosure of which is hereby incorporated by reference in its entirety.

What is claimed is:

1. A method of operating an internal combustion engine having an inlet control device for controlling flow of intake air into at least one cylinder, a fuel injection device for supplying fuel into the cylinder and an outlet control device for controlling flow of exhaust gas resulting from combustion within the cylinder, which inlet and outlet control devices are adjusted to retain a portion of the exhaust gas for subjecting the retained exhaust gas to compression, the method comprising:

monitoring a parameter indicative of engine-surrounding environment; and adjusting closing timing of the outlet control device in response to the monitored engine-surrounding environment indicative parameter, thereby to vary an exhaust gas retaining duration from the closing timing event of the outlet control device to opening timing event of the inlet control device when there is a change in the monitored engine-surrounding environment indicative parameter.

2. The method as claimed in claim 1, wherein the engine-surrounding environment indicative parameter is temperature of the intake air, and wherein the closing timing of the outlet control device is moved in such a direction as to elongate the exhaust gas retaining duration when the temperature of the intake air drops.

3. The method as claimed in claim 1, wherein the engine-surrounding environment indicative parameter is temperature of the intake air, wherein the fuel injection device is operative to perform a split injection into the cylinder wherein a first injection event is separated from a second injection event and occurs during the exhaust gas retaining duration, wherein a fuel quantity for the first injection is a portion of the total fuel quantity to be injected into the cylinder, and further comprising increasing the fuel quantity for the first injection when the temperature of the intake air drops.

4. The method as claimed in claim 3, further comprising:

establishing an exhaust gas retaining duration threshold;

comparing the exhaust gas retaining duration with the exhaust gas retaining duration threshold; and increasing the fuel quantity for the first injection when the exhaust gas retaining duration is longer than the exhaust gas retaining duration threshold.

5. The method as claimed in claim 1, wherein the engine-surrounding environment indicative parameter is flow rate of the intake air, and wherein the closing timing of the outlet control device is moved in such a direction as to shorten the exhaust gas retaining duration when the flow rate of the intake air drops.

6. The method as claimed in claim 1, wherein the engine-surrounding environment indicative parameter is independent from a parameter indicative of load request on the engine and a parameter indicative of the engine speed.

7. The method as claimed in claim 6, wherein the step of adjusting closing timing of the outlet control device comprises:

monitoring the load request indicative parameter;

monitoring the engine speed indicative parameter;

determining a base value of the exhaust gas retaining duration in response to the monitored load request and engine speed indicative parameters;

correcting the determined base value in response to the monitored engine-surrounding environment indicative parameter to provide a corrected value of the exhaust gas retaining duration; and providing valve timing including the closing timing of the outlet control device to accomplish the corrected value of the exhaust gas retaining duration.

8. The method as claimed in claim 7, wherein the engine-surrounding environment indicative parameter represents temperature of the intake air, and wherein the closing timing of the outlet control device is moved in such a direction as to elongate the exhaust gas retaining duration when the temperature of the intake air drops.

9. The method as claimed in claim 7, wherein the engine-surrounding environment indicative parameter represents temperature of the intake air, wherein the fuel injection device is operative to perform a split injection into the cylinder wherein a first injection event is separated from a second injection event and occurs during the exhaust gas retaining duration, wherein a fuel quantity for the first fuel injection is a portion of the total fuel quantity to be injected into the cylinder, and further comprising increasing the fuel quantity for the first injection with decreasing of the temperature of the intake air.

10. The method as claimed in claim 9, further comprising:

establishing an exhaust gas retaining duration threshold;

comparing the exhaust gas retaining duration with the exhaust gas retaining duration threshold;

increasing the fuel quantity for the first injection when the exhaust gas retaining duration is longer than the exhaust gas retaining duration threshold.

11. The method as claimed in claim 7, wherein the engine-surrounding environment indicative parameter represents flow rate of the intake air, and wherein the closing timing of the outlet control device is moved in such a direction as to shorten the exhaust gas retaining duration when the flow rate of the intake air drops.

12. A method of operating an internal combustion engine having an inlet control device for controlling flow of intake air into at least one cylinder, a fuel injection device for supplying fuel into the cylinder and an outlet control device for controlling flow of exhaust gas from the cylinder, which inlet and outlet control devices are adjusted to retain a portion of the exhaust gas for subjecting the retained exhaust gas to compression, the method comprising:

monitoring an engine operating temperature; and adjusting closing timing of the outlet control device in response to the monitored engine operating temperature, thereby to vary an exhaust gas retaining duration from the closing timing event of the outlet control device to opening timing event of the inlet control device when there is a change in the monitored engine operating temperature.

13. The method as claimed in claim 12, wherein the closing timing of the outlet control device is moved in such a direction as to elongate the exhaust gas retaining duration when the monitored engine operating temperature drops.

14. The method as claimed in claim 12, wherein the fuel injection device is operative to perform a split injection into the cylinder wherein a first injection event is separated from the second injection event and occurs during the exhaust gas retaining duration, wherein a fuel quantity for the first injection is a portion of the total fuel quantity to be injected into the cylinder, and further comprising increasing the fuel quantity for the first injection when the monitored engine operating temperature drops.

15. The method as claimed in claim 12, wherein the monitored engine operating temperature is one of an engine oil temperature and an engine coolant temperature.

16. The method as claimed in claim 12, wherein the fuel injection device is operative to perform a split injection into the cylinder wherein a first injection event is separated from a second injection event and occurs during the exhaust gas retaining duration, wherein a fuel quantity for the first injection is a portion of the total fuel quantity to be injected into the cylinder, and further comprising increasing the fuel quantity for the first injection when temperature of exhaust gas drops.

17. The method as claimed in claim 12, wherein the step of adjusting closing timing of the outlet control device comprises:

monitoring the load request indicative parameter;

monitoring the engine speed indicative parameter;

determining a base value of the exhaust gas retaining duration in response to the monitored load request and engine speed indicative parameters;

correcting the determined base value in response to the monitored engine operating temperature to provide a corrected value of the exhaust gas retaining duration; and providing valve timing including the closing timing of the outlet control device to accomplish the corrected value of the exhaust gas retaining duration.

18. The method as claimed in claim 17, wherein the closing timing of the outlet control device is moved in such a direction as to elongate the exhaust gas retaining duration when the monitored engine operating temperature drops.

19. The method as claimed in claim 17, wherein the fuel injection device is operative to perform a split injection into the cylinder wherein a first injection event is separated from the second injection event and occurs during the exhaust gas retaining duration, wherein a fuel quantity for the first injection is a portion of the total fuel quantity to be injected into the cylinder, and further comprising increasing the fuel quantity for the first injection with decreasing of the monitored engine operating temperature.

20. The method as claimed in claim 17, wherein the monitored engine operating temperature is one of an engine oil temperature and an engine coolant temperature.

21. The method as claimed in claim 17, wherein the fuel injection device is operative to perform a split injection into the cylinder wherein a first injection event is separated from a second injection event and occurs during the exhaust gas retaining duration, wherein a fuel quantity for the first injection is a portion of the total fuel quantity to be injected into the cylinder, and further comprising increasing the fuel quantity for the first injection when temperature of exhaust gas drops.

22. A method of operating an internal combustion engine having an inlet control device for controlling flow of intake air into at least one cylinder, a fuel injection device for supplying fuel into the cylinder, and an outlet control device for controlling flow of exhaust gas resulting from combustion within the cylinder, which inlet and outlet control devices are adjusted to retain a portion of the exhaust gas for subjecting the retained exhaust gas to compression, the method comprising:

establishing a predetermined window about a desired level of combustion stability within the engine;

monitoring an actual level of combustion stability within the engine; comparing the monitored actual level of combustion stability with the predetermined window; and adjusting closing timing of the inlet control device in response to the result of the comparing step such that, when the monitored actual level of combustion stability falls outside of the predetermined window, the closing timing of the inlet control device is moved in such a direction as to bring the monitored actual level of combustion stability into the predetermined window.

23. The method as claimed in claim 22, further comprising:

adjusting closing timing of the outlet control device in response to the result of the comparing step, thereby to elongate an exhaust gas retaining duration from the closing timing event of the outlet control device to opening timing event of the inlet control device when the monitored actual level of combustion stability falls outside of the predetermined window.

24. The method as claimed in claim 22, wherein the fuel injection device is operative to perform a split injection into the cylinder wherein a first injection event is separated from a second injection event and occurs during the exhaust gas retaining duration, wherein a fuel quantity for the first injection is a portion of the total fuel quantity to be injected into the cylinder, and further comprising increasing the fuel quantity for the first injection when the monitored actual level of combustion stability falls outside of the predetermined window.

25. A method of operating an internal combustion engine having an inlet control device for controlling flow of intake air into at least one cylinder, a fuel injection device for supplying fuel into the cylinder and an outlet control device for controlling flow of exhaust gas resulting from combustion within the cylinder, which inlet and outlet control devices are adjusted to retain a portion of the exhaust gas for subjecting the retained exhaust gas to compression, the method comprising:

monitoring a parameter indicative of engine-surrounding environment; and adjusting closing timing of the inlet control device in response to the monitored engine-surrounding environment indicative parameter.

26. The method as claimed in claim 25, wherein the engine-surrounding environment indicative parameter is pressure of the intake air, and wherein the closing timing of the inlet control device is moved in such a direction as to increase the volumetric efficiency when the pressure of the intake air drops.

27. The method as claimed in claim 25, wherein the engine-surrounding environment indicative parameter is pressure of intake air, wherein the fuel injection device is operative to perform a split injection into the cylinder wherein a first injection event is separated from a second injection event and occurs during the exhaust gas retaining duration, wherein a fuel quantity for the first injection is a portion of the total fuel quantity to be injected into the cylinder, and further comprising increasing the fuel quantity for the first injection when the pressure of the intake air drops.

28. The method as claimed in claim 25, wherein the engine-surrounding environment indicative parameter is flow rate of the intake air, and wherein the closing timing of the inlet control device is moved in such a direction as to increase volumetric efficiency when the flow rate of the intake air drops.

29. The method as claimed in claim 28, further comprising:

establishing an inlet control device closing timing threshold in response to the engine speed;

comparing the closing timing of the inlet control device with the inlet control device closing timing threshold; and moving the closing timing of the outlet control device in such a direction as to shorten an exhaust gas retaining duration from the closing timing event of the outlet control device to opening timing event of the inlet control device when the closing timing of the inlet control device has moved toward bottom dead center during induction process beyond the inlet control device closing timing threshold.

30. The method as claimed in claim 25, wherein the engine-surrounding environment indicative parameter is independent from a parameter indicative of load request on the engine and a parameter indicative of the engine speed.

31. The method as claimed in claim 30, wherein the step of adjusting closing timing of the inlet control device comprises:

monitoring the load request indicative parameter;

monitoring the engine speed indicative parameter;

determining a base value of closing timing of the inlet control device in response to the monitored load request and engine speed indicative parameters; and correcting the determined base value in response to the monitored engine-surrounding environment indicative parameter to provide a corrected value of the closing timing of the inlet control device.

32. The method as claimed in claim 30, wherein the engine-surrounding environment indicative parameter represents pressure of the intake air, and wherein the closing timing of the inlet control device is moved in such a direction as to increase the volumetric efficiency when the pressure of the intake air drops.

33. The method as claimed in claim 32, wherein the engine-surrounding environment indicative parameter represents pressure of intake air, wherein the fuel injection device is operative to perform a split injection into the cylinder wherein a first injection event is separated from a second injection event and occurs during the exhaust gas retaining duration, wherein a fuel quantity for the first injection is a portion of the total fuel quantity to be injected into the cylinder, and further comprising increasing the fuel quantity for the first injection with decreasing of the pressure of the intake air.

34. The method as claimed in claim 31, wherein the engine-surrounding environment indicative parameter is flow rate of the intake air, and wherein the closing timing of the inlet control device is moved in such a direction as to increase the volumetric efficiency with decreasing of the flow rate of the intake air.

35. The method as claimed in claim 34, further comprising:
   establishing an inlet control device closing timing threshold in response to the engine speed indicative parameter;
   comparing the closing timing of the inlet control device with the inlet control device closing timing threshold; and
   moving the closing timing of the outlet control device in such a direction as to shorten an exhaust gas retaining duration from closing timing event of the outlet control device to opening timing event of the inlet control device when the closing timing of the inlet control device has moved toward bottom dead center during induction process beyond the inlet control device closing timing threshold.

36. A system for operating an internal combustion engine having cylinders, comprising:
   an inlet control device for controlling flow of intake air into at least one of the cylinders;
   a fuel injection device for supplying fuel into the cylinder;
   an outlet control device for controlling flow of exhaust gas resulting from combustion within the cylinder;
   the inlet and outlet control devices being capable for retaining a portion of the exhaust gas for subjecting the retained exhaust gas to compression;
   a controller for controlling the inlet and outlet control devices; and
   a computer readable storage media having data stored therein representing instructions executable by the controller to control closing and opening timings of the inlet and outlet control devices to retain a portion of the exhaust gas for subjecting the retained exhaust gas to compression, the computer readable storage media including instructions for operating the controller to:
      monitor a parameter indicative of engine-surrounding environment; and
      adjust closing timing of the outlet control device in response to the monitored engine-surrounding environment indicative parameter, thereby to vary an exhaust gas retaining duration from the closing timing event of the outlet control device to opening timing event of the inlet control device when there is a change in the monitored engine-surrounding environment indicative parameter.

37. The system as claimed in claim 36, wherein the engine-surrounding environment indicative parameter is independent from a parameter indicative of load request on the engine and a parameter indicative of the engine speed.

38. The system as claimed in claim 37, wherein the instructions for operating the controller to adjust closing timing of the outlet control device comprise instructions for:
   monitoring the load request indicative parameter;
   monitoring the engine speed indicative parameter;
   determining a base value of the exhaust gas retaining duration in response to the monitored load request and engine speed indicative parameters;
   correcting the determined base value in response to the monitored engine-surrounding environment indicative parameter to provide a corrected value of the exhaust gas retaining duration; and
   providing valve timing including the closing timing of the outlet control device to accomplish the corrected value of the exhaust gas retaining duration.

39. A system for operating an internal combustion engine having cylinders, comprising:
   an inlet control device for controlling flow of intake air into at least one of the cylinders;
   a fuel injection device for supplying fuel into the cylinder;
   an outlet control device for controlling flow of exhaust gas resulting from combustion within the cylinder;
   the inlet and outlet control devices being capable for retaining a portion of the exhaust gas for subjecting the retained exhaust gas to compression;
   a controller for controlling the inlet and outlet control devices; and
   a computer readable storage media having data stored therein representing instructions executable by the controller to control closing and opening timings of the inlet and outlet control devices to retain a portion of the exhaust gas for subjecting the retained exhaust gas to compression, the computer readable storage media including instructions for operating the controller to:
      monitor a parameter indicative of engine-surrounding environment; and
      adjust closing timing of the inlet control device in response to the monitored engine-surrounding environment indicative parameter.

40. The system as claimed in claim 39, wherein the engine-surrounding environment indicative parameter is independent from a parameter indicative of load request on the engine and a parameter indicative of the engine speed.

41. The system as claimed in claim 40, wherein the instructions for operating the controller to adjust closing timing of the outlet control device comprise instructions for:
   monitoring the load request indicative parameter;
   monitoring the engine speed indicative parameter;
   determining a base value of closing timing of the inlet control device in response to the monitored load request and engine speed indicative parameters; and
   correcting the determined base value in response to the monitored engine-surrounding environment indicative parameter to provide a corrected value of the closing timing of the inlet control device.

42. A system for operating an internal combustion engine having cylinders, comprising:
   an inlet control device for controlling flow of intake air into at least one of the cylinders;
   a fuel injection device for supplying fuel into the cylinder;
   an outlet control device for controlling flow of exhaust gas resulting from combustion within the cylinder;
   the inlet and outlet control devices being capable for retaining a portion of the exhaust gas for subjecting the retained exhaust gas to compression;
   a controller for controlling the inlet and outlet control devices; and
   a computer readable storage media having data stored therein representing instructions executable by the controller to control closing and opening timings of the inlet and outlet control devices to retain a portion of the exhaust gas for subjecting the retained exhaust gas to compression, the computer readable storage media including instructions for operating the controller to:
      monitor an engine operating temperature; and
      adjust closing timing of the outlet control device in response to the monitored engine operating temperature, thereby to vary an exhaust gas retaining duration from the closing timing event of the outlet control device to opening timing event of the inlet control device when there is a change in the monitored engine operating temperature.

43. The system as claimed in claim 42, wherein the instruction for operating the controller to adjust closing timing of the outlet control device comprise instructions for:

monitoring the load request indicative parameter;

monitoring the engine speed indicative parameter;

determining a base value of the exhaust gas retaining duration in response to the monitored load request and engine speed indicative parameters;

correcting the determined base value in response to the monitored engine operating temperature to provide a corrected value of the exhaust gas retaining duration; and providing valve timing including the closing timing of the outlet control device to accomplish the corrected value of the exhaust gas retaining duration.

44. A system for operating an internal combustion engine having cylinders, comprising:

an inlet control device for controlling flow of intake air into at least one of the cylinders;

a fuel injection device for supplying fuel into the cylinder;

an outlet control device for controlling flow of exhaust gas resulting from combustion within the cylinder;

the inlet and outlet control devices being capable for retaining a portion of the exhaust gas for subjecting the retained exhaust gas to compression;

a controller for controlling the inlet and outlet control devices; and a computer readable storage media having data stored therein representing instructions executable by the controller to control closing and opening timings of the inlet and outlet control devices to retain a portion of the exhaust gas for subjecting the retained exhaust gas to compression, the computer readable storage media including instructions for operating the controller to:

establish a predetermined window about a desired level of combustion stability within the cylinder;

monitor an actual level of combustion stability within the cylinder;

compare the monitored actual level of combustion stability with the predetermined window; and adjust closing timing of the inlet control device in response to the result of the comparing step such that, when the monitored actual level of combustion stability falls outside of the predetermined window, the closing timing of the inlet control device is moved in such a direction as to bring the monitored actual level of combustion stability into the predetermined window.

45. A method of operating an internal combustion engine having an inlet control device for controlling flow of intake air into at least one cylinder, a fuel injection device for supplying fuel into the cylinder and an outlet control device for controlling flow of exhaust gas resulting from combustion within the cylinder, which inlet and outlet control devices are adjusted to retain a portion of the exhaust gas for subjecting the retained exhaust gas to compression, the method comprising:

monitoring a parameter indicative of load request on the engine;

monitoring a parameter indicative of the engine speed;

determining a base value of an exhaust gas retaining duration from the closing timing event of the outlet control device to opening timing event of the inlet control device and a base value of closing timing of the inlet control device in response to the monitored load request and engine speed indicative parameters;

monitoring a parameter indicative of engine-surrounding environment;

correcting the determined base values in response to the monitored engine-surrounding environment indicative parameter to provide a corrected value of the exhaust gas retaining duration and a corrected value of the closing timing of the inlet control device;

providing valve timing including closing timing of the outlet control device to accomplish the corrected value of the exhaust gas retaining duration; and regulating the outlet control device to close at the closing timing and the inlet control device to close at the corrected value of the closing timing of the inlet control device, thereby to provide variation in the exhaust gas retaining duration when there is a change in the monitored engine-surrounding environment indicative parameter.

46. A method of operating an internal combustion engine having an inlet control device for controlling flow of intake air into at least one cylinder, a fuel injection device for supplying fuel into the cylinder and an outlet control device for controlling flow of exhaust gas resulting from combustion within the cylinder, which inlet and outlet control devices are adjusted to retain a portion of the exhaust gas for subjecting the retained exhaust gas to compression, the method comprising:

monitoring a parameter indicative of load request on the engine;

monitoring a parameter indicative of the engine speed;

determining a desired value of in-cylinder temperature around top dead center (TDC) during compression process, a desired value of in-cylinder pressure around the TDC during compression process, and a desired value of mass of air within the cylinder around the TDC during compression process in response to the monitored load request and engine speed indicative parameters;

determining an estimated value of in-cylinder temperature around top dead center (TDC) during compression process, an estimated value of in-cylinder pressure around the TDC during compression process, and an estimated value of mass of air within the cylinder around the TDC during compression process;

calculating errors between the estimated and the desired values, respectively;

determining a base value of an exhaust gas retaining duration from closing timing event of the outlet control device to opening timing event of the inlet control device and a base value of closing timing of the inlet control device in response to the calculated errors, such that the desired values are accomplished;

monitoring an actual level of combustion stability;

correcting the determined base values in response to the monitored actual level of combustion stability to provide a corrected value of the exhaust gas retaining duration and a corrected value of the closing timing of the inlet control device;

providing valve timing including closing timing of the outlet control device to accomplish the corrected value of the exhaust gas retaining duration; and regulating the outlet control device to close at the closing timing and the inlet control device to close at the corrected value of the closing timing of the inlet control device, thereby to provide variation in the exhaust gas retaining duration when there is a change in the monitored engine-surrounding environment indicative parameter.

* * * * *